(12) United States Patent
Sinha et al.

(10) Patent No.: US 8,798,357 B2
(45) Date of Patent: Aug. 5, 2014

(54) IMAGE-BASED LOCALIZATION

(75) Inventors: Sudipta N Sinha, Redmond, WA (US);
Hyon Lim, Seoul (KR); Michael Cohen, Seattle, WA (US); Matt Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 13/544,817

(22) Filed: Jul. 9, 2012

(65) Prior Publication Data

US 2014/0010407 A1    Jan. 9, 2014

(51) Int. Cl.
*G06K 9/00*    (2006.01)

(52) U.S. Cl.
USPC .......................................... 382/154; 345/419

(58) Field of Classification Search
USPC .................... 382/100, 103, 154, 168, 170; 345/419–427; 356/12
See application file for complete search history.

(56) References Cited

U.S. PATENT DOCUMENTS

| | | | |
|---|---|---|---|
| 6,594,600 B1 * | 7/2003 | Arnoul et al. ................. | 702/94 |
| 7,822,264 B2 | 10/2010 | Balslev et al. | |
| 7,831,094 B2 * | 11/2010 | Gupta et al. ................. | 382/190 |
| 7,847,844 B2 * | 12/2010 | Takemoto et al. ........... | 348/286 |
| 7,965,904 B2 * | 6/2011 | Kobayashi .................... | 382/292 |
| 2006/0262962 A1 * | 11/2006 | Hull et al. .................... | 382/103 |
| 2008/0310757 A1 * | 12/2008 | Wolberg et al. .............. | 382/285 |
| 2009/0010507 A1 * | 1/2009 | Geng ............................ | 382/128 |
| 2009/0324087 A1 | 12/2009 | Kletter | |
| 2010/0188396 A1 * | 7/2010 | Mejdrich et al. ............. | 345/419 |
| 2011/0032347 A1 | 2/2011 | Lacey et al. | |
| 2011/0071675 A1 | 3/2011 | Wells et al. | |
| 2011/0150319 A1 * | 6/2011 | Ramalingam ................ | 382/153 |
| 2011/0286631 A1 * | 11/2011 | Wagner et al. ............... | 382/103 |
| 2012/0306850 A1 * | 12/2012 | Balan et al. .................. | 345/419 |

OTHER PUBLICATIONS

Achtelik, M., M. Achtelik, S. Weiss, R. Siegwart, Onboard IMU and monocular vision based control for MAVs in unknown in- and outdoor environments, IEEE Int'l Conf. On Robotics and Automation, ICRA 2011, May 9-13, 2011, pp. 3056-3063, Shanghai, China.

Arth, C., D. Wagner, M. Klopschitz, A. Irschara, D. Schmalstieg, Wide area localization on mobile phones, 8th IEEE Int'l Symposium on Mixed and Augmented Reality, ISMAR 2009, Oct. 19-22, 2009, pp. 73-82, Orlando, Florida, USA.

Arya, S., D. M. Mount, Approximate nearest neighbor queries in fixed dimensions, Proc. of the Fourth Annual ACM/SIGACT-SIAM Symposium on Discrete Algorithms, SODA 1993, Jan. 25-27, 1993, pp. 271-280, Austin, Texas.

Blösch, M., S. Weiss, D. Scaramuzza, R. Siegwart, Vision based MAV navigation in unknown and unstructured environments, IEEE Int'l Conf. on Robotics and Automation, ICRA 2010, May 3-7, 2010, pp. 21-28, Anchorage, Alaska, USA.

(Continued)

*Primary Examiner* — Anand Bhatnagar
(74) *Attorney, Agent, or Firm* — Steve Wight; Carole Boelitz; Micky Minhas

(57) ABSTRACT

Image-based localization technique embodiments are presented which provide a real-time approach for image-based video camera localization within large scenes that have been reconstructed offline using structure from motion or similar techniques. From monocular video, a precise 3D position and 3D orientation of the camera can be estimated on a frame by frame basis using only visual features.

20 Claims, 18 Drawing Sheets

(56) References Cited

OTHER PUBLICATIONS

Boiman, O., E. Shechtman, M. Irani, In defense of nearest-neighbor based image classification, 2008 IEEE Comp. Soc. Conf. on Comp. Vision and Pattern Recognition, CVPR 2008, Jun. 24-26, 2008, pp. 1-8, Anchorage, Alaska, USA.

Calonder, M., V. Lepetit, C. Strecha, P. Fua, BRIEF: Binary robust independent elementary features, Proc. of the 11th European Conf. on Comp. Vision, ECCV, Sep. 5-11, 2010, pp. 778-792, vol. 4, Springer, Heraklion, Crete, Greece.

Castle, R. O., G. Klein, D. W. Murray, Wide-area augmented reality using camera tracking and mapping in multiple regions, Computer Vision and Image Understanding, Jun. 2011, pp. 854-867, vol. 115, No. 6.

Chapoulie, A., P. Rives, D. Filliat, A spherical representation for efficient visual loop closing, IEEE Int'l Conf. on Comp. Vision Workshops, ICCV 2001 Workshops, pp. 335-342, Nov. 6-13, 2011, Barcelona, Spain.

Comport, A. I., É. Marchand, M. Pressigout, F. Chaumette, Real-time markerless tracking for augmented reality: The virtual visual servoing framework, IEEE Trans. Vis. Comput. Graph., Jul.-Aug. 2006, pp. 615-628, vol. 12, No. 4.

COMPULAB, fit-PC, retrieved from http://www.fit-pc.com/web/, Jun. 20, 2012, p. 1.

Davison, A. J., I. D. Reid, N. Molton, O. Stasse, MonoSLAM: Real-time single camera SLAM, IEEE Trans. Pattern Anal. Mach. Intell., Jun. 2007, pp. 1052-1067, vol. 29, No. 6.

Dong, Z., G. Zhang, J. Jia, H. Bao, Keyframe-based real-time camera tracking, IEEE 12th Int'l Conf. on Comp. Vision, ICCV 2009, Sep. 27-Oct. 4, 2009, pp. 1538-1545, Kyoto, Japan.

Fischler, M. A., R. C. Bolles, Random sample consensus: A paradigm for model fitting with applications to image analysis and automated cartography, Commun. ACM, Jun. 1981, pp. 381-395, vol. 24, No. 6.

Furukawa, Y., B. Curless, S. M. Seitz, R. Szeliski, Towards Internet-scale multi-view stereo, The Twenty-Third IEEE Conf. on Comp. Vision and Pattern Recognition, CVPR 2010, Jun. 13-18, 2010, pp. 1434-1441, San Francisco, CA, USA.

Irschara, A., C. Zach, J.-M. Frahm, H. Bischof, From structure-from-motion point clouds to fast location recognition, 2009 IEEE Comp. Soc. Conf. on Comp. Vision and Pattern Recognigiton, CVPR 2009, Jun. 20-25, 2009, pp. 2599-2606, Miami, Florida, USA.

Jeong, Y., D. Nistér, D. Steedly, R. Szeliski, I.-S. Kweon, Pushing the envelope of modem methods for bundle adjustment, The Twenty-Third IEEE Conf. on Comp. Vision and Pattern Recognition, CVPR 2010, Jun. 13-18, 2010, pp. 1474-1481, San Francisco, CA, USA.

Klein, G., D. W. Murray, Parallel tracking and mapping for small AR workspaces, Sixth IEEE/ACM Int'l Symposium on Mixed and Augmented Reality, ISMAR 2007, Nov. 13-16, 2007, pp. 225-234, Nara, Japan.

Koch, R., K. Koeser, B. Streckel, J. F. Evers-Senne, Markerless image-based 3D tracking for real-time.augmented reality applications, International Workshop on Image Analysis for Multimedia Interactive Services, Apr. 13-15, 2005, pp. 4, vol. 154, No. 3.

Lepetit, V., P. Fua, Keypoint recognition using randomized trees, J. IEEE Transactions on Pattern Analysis and Machine Intelligence, Sep. 2006, pp. 1465-1479, vol. 28, No. 9, IEEE Computer Society Washington, DC, USA.

Li, Y., N. Snavely, D. P. Huttenlocher, Location recognition using prioritized feature matching, Proc. 11th European Conf. on Comp. Vision, ECCV 2010, Sep. 5-11, 2010, pp. 791-804, Springer 2010, Heraklion, Crete, Greece.

Liu, J., X. Liang, I-BRIEF: A fast feature point descriptor with more robust features, 2011 Seventh Int'l Conf. on Signal-Image Technology and Internet-Based Systems, SITIS 2011, Nov. 28, 2011-Dec. 1, 2011, pp. 322-328.

Lowe, D. G., Distinctive image features from scale-invariant keypoints, Int'l J. of Comp. Vision, Nov. 2004, pp. 91-110, vol. 60, No. 2, Kluwer Academic Publishers, Hingham, MA, USA.

Meier, L., P. Tanskanen, F. Fraundorfer, M. Pollefeys, PIXHAWK: A system for autonomous flight using onboard computer vision, IEEE Int'l Conf. on Robotics and Automation, ICRA 2011, May 9-13, 2011, pp. 2992-2997, Shanghai, China.

Nistér, D., H. Stewenius, Scalable recognition with a vocabulary tree, 2006 IEEE Comp. Society Conf. on Comp. Vision and Pattern Recognition, CVPR 2006, Jun. 17-22, 2006, pp. 2161-2168, New York, NY, USA.

Özuysal, M., M. Calonder, V. Lepetit, P. Fua, Fast keypoint recognition using random ferns, IEEE Trans. Pattern Anal. Mach. Intell., Mar. 2010, pp. 448-461, vol. 32, No. 3.

Robertson, D., R. Cipolla, An image-based system for urban navigation, British Machine Vision Conf., Sep. 7, 2004, pp. 819-828.

Royer, E., M. Lhuillier, M. Dhome, J.-M. Lavest, Monocular vision for mobile robot localization and autonomous navigation, Int'l J. of Comp. Vision, Sep. 2007, pp. 237-260, vol. 74, No. 3, Kluwer Academic Publishers Hingham, MA, USA.

Sattler, T., B. Leibe, L. Kobbelt, Fast image-based localization using direct 2D-to-3D matching, IEEE Int'l Conf. on Comp. Vision, ICCV 2011, Nov. 6-13, 2011, pp. 667-674, Barcelona, Spain.

Schindler, G., M. Brown, R. Szeliski, City-scale location recognition, 2007 IEEE Comp. Soc. Conf. on Comp. Vision and Pattern Recognition, CVPR 2007, Jun. 2007, pp. 18-23, Minneapolis, Minnesota, USA.

Se, S., D. G. Lowe, J. J. Little, Vision-based mobile robot localization and mapping using scale-invariant features, Proc. of the 2001 IEEE Int'l Conf. on Robotics and Automation, ICRA 2001, May 21-26, 2001, pp. 2051-2058, Seoul, Korea.

Skrypnyk, I., D. G. Lowe, Scene modelling, recognition and tracking with invariant image features, 3rd IEEE ACM Int'l Symposium on Mixed and Augmented Reality, ISMAR 2004, Nov. 2-5, 2004, pp. 110-119, Arlington, VA, USA.

Snavely, N., S. M. Seitz, R. Szeliski, Modeling the world from internet photo collections, Int'l J. of Comp. Vision, Nov. 2008, pp. 189-210, vol. 80, No. 2.

Ta, D.-N., W.-C. Chen, N. Gelfand, K. Pulli, SURFTrac: Efficient tracking and continuous object recognition using local feature descriptors, 2009 IEEE Comp. Soc. Conf. on Comp. Vision and Pattern Recognition, CVPR 2009, Jun. 20-25, 2009, pp. 2937-2944, Miami, Florida, USA.

Tola, E., V. Lepetit, P. Fua, A fast local descriptor for dense matching, 2008 IEEE Comp. Soc. Conf. on Comp. Vision and Pattern Recognition, CVPR 2008, Jun. 24-26, 2008, pp. 8, Anchorage, Alaska, USA.

Tomasi, C., T. Kanade, Detection and tracking of point features, Technical Report CMU-CS-91-132, Shape and Motion from Image Streams: A Factorization Method—Part 3, Apr. 1991, pp. 1-20.

Wagner, D., G. Reitmayr, A. Mulloni, T. Drummond, D. Schmalstieg, Real-time detection and tracking for augmented reality on mobile phones, IEEE Trans. Vis. Comput. Graph., May/Jun. 2010, pp. 355-368, vol. 16, No. 3.

Williams, B. P., G. Klein, I. D. Reid, Real-time SLAM relocalisation, IEEE 11th Int'l Conf. on Comp. Vision, ICCV 2007, Oct. 14-20, 2007, pp. 1-8, Rio de Janeiro, Brazil.

Winder, S. A. J., G. Hua, M. Brown, Picking the best DAISY, 2009 IEEE Comp. Soc. Conf. on Comp. Vision and Pattern Recognition, CVPR 2009, Jun. 20-25, 2009, pp. 178-185, Miami, Florida, USA.

\* cited by examiner

IMAGE-BASED LOCALIZATION

BACKGROUND

Computing the 3D position and 3D orientation of a camera with respect to a geometric representation of the scene (which is sometimes referred to as image-based localization) has important applications in location recognition, autonomous robot navigation, and augmented reality, among others. Broadly speaking, there are two approaches to image-based localization. The first involves simultaneous localization and mapping (SLAM), where the camera is localized within an unknown scene. In contrast, approaches in the second category use the knowledge of a prior map or 3D scene model.

It is believed the second approach has the most promise with regard real-time image-based localization in large environments. Such real-time, large environment image-based localization is needed for example in autonomous aerial navigation, especially in GPS-denied areas. It is particularly attractive for micro-aerial vehicles (MAV), such as a quadrotor, which can have limited payload but be capable of full-fledged onboard vision processing.

SUMMARY

Image-based localization technique embodiments described herein generally involve computing the 3D position and 3D orientation of a video camera used to capture sequential image frames of an environment, for which a three dimensional reconstruction (3DR) has been pre-computed, to identify 3D points in the environment that correspond to certain 2D pixel locations in previously-captured images. This 3D position and 3D orientation estimate can be computed on a real time or near real time basis.

In one embodiment, this is accomplished by first constructing an indexed database. This indexed database includes multiple representative database descriptors for each 3D point in the 3D reconstruction. These database descriptors are computed at different scales and from multiple ones of previously-captured environmental images.

Once the indexed database is constructed, image frames are input from the video camera as they are captured. For each frame input the following actions are performed. First, tracked keypoints are identified in the image frame. These tracked keypoints represent 2D image frame locations, and can be newly added or corresponding to keypoints in one or more previously-input image frames. It is noted that a keypoint can be any identifiable point in an image. A database descriptor is then computed for each newly added tracked keypoint identified in the image frame under consideration. These database descriptors are of the same type as those computed for the indexed database. Next, 3D points are identified in the 3D reconstruction of the environment that correspond to the tracked keypoints. This identification of the 3D points involves, for each tracked keypoint, matching the database descriptor computed for the tracked keypoint to one or more descriptors in the indexed database and determining the 3D point associated with the matched database descriptors. Finally, the 3D position and 3D orientation of the video camera are estimated from the recovered matches.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
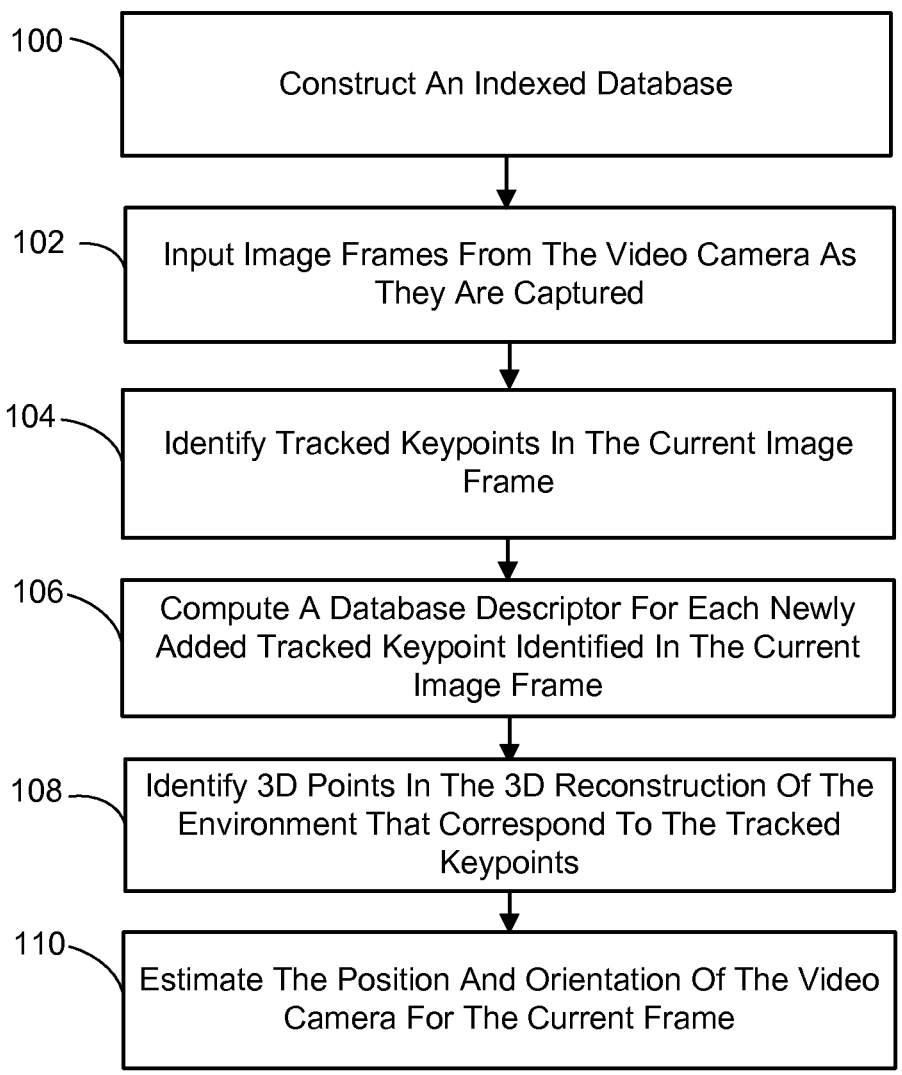
FIG. 1 is a flow diagram generally outlining one embodiment of a process for computing the 3D position and 3D orientation of a video camera used to capture sequential image frames of an environment for which a three dimensional (3D) reconstruction has been pre-computed.

In the following description of image-based localization technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that specific terminology will be resorted to in describing the present invention for the sake of clarity and it is not intended for the present invention to be limited to the specific terms so chosen. Furthermore, it is to be understood that each specific term comprises all its technical equivalents that operate in a broadly similar manner to achieve a similar purpose. Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of process flow representing one or more embodiments of the invention do not inherently indicate any particular order nor imply any limitations of the invention.

1.0 Image-Based Localization

Image-based localization technique embodiments described herein provide a real-time approach for image-based video camera localization within large scenes that have been reconstructed offline. In one embodiment, this 3D reconstruction (3DR) takes the form of a point cloud created using structure from motion (SFM). From monocular video, embodiments of the technique continuously compute a precise 3D position and 3D orientation of the camera (sometimes referred to herein as six degree of freedom (6-DOF) camera pose or just camera pose for short). Generally this is accomplished by efficiently tracking natural scene features in the video and matching them to 3D points in the point cloud. In addition, embodiments of the technique involve efficiently interleaving a fast keypoint tracker that uses inexpensive binary feature descriptors with an approach for direct 2D-to-3D matching. This 2D-to-3D matching avoids the need for online extraction of scale-invariant features. Instead, in one embodiment, an indexed database is constructed offline that contains multiple descriptors per 3D point extracted at multiple scales. One of the keys to the aforementioned efficiency lies in invoking descriptor extraction and matching sparingly during localization, and in distributing this computation over successive frames. This enables embodiments of the technique to run in real-time, with minimal fluctuations in frame rate and latency over long durations.

More particularly, image-based localization embodiments described herein employ fast keypoint tracking to track keypoints (e.g., Harris corners) identified in one frame to the following frame. Generally, this is accomplished by matching to candidate keypoints within a local search neighborhood in the next frame. In one embodiment, inexpensive to compute, binary feature descriptors (e.g., BRIEF descriptors) are used to find the best frame-to-frame match. This fast tracking is interleaved with an efficient approach to find corresponding 3D points in the 3D reconstruction to the tracked keypoints. The resulting 2D-3D correspondences are then used to robustly determine the camera pose for each frame. For determining these correspondences, in one embodiment, features are matched using so-called DAISY descriptors, and a kd-tree index to efficiently search the database of indexed DAISY descriptors.

The foregoing approach has the advantage of achieving real-time or near real-time performance by avoiding the need for extracting scale-invariant keypoints at runtime. However, matching features across different scales is important for reliable 2D-to-3D matching. This requirement is addressed by computing redundant descriptors during offline processing, i.e., multiple descriptors for each 3D point in the 3D reconstruction, extracted at different scales from multiple images. In one embodiment, corresponding camera indices are stored along with the descriptors. As will be described in more detail later, this efficiently facilitates performing place recognition, which is used to prune false 2D-3D matches prior to geometric verification during camera pose estimation.

In one embodiment, the foregoing feature matching can also be used for localizing a single image from scratch. This is referred to as global matching and it facilitates localizing the camera in the first frame and quick re-localization when the camera is lost. However, at other times when tracking is successful, a much more efficient guided matching approach is adopted for 2D-to-3D matching. This guided matching is optimized by recovering multiple (one-to-many) 2D-3D match hypotheses for each tracked keypoint, and by distributing the computation in batches over successive frames. It is noted that outliers in the 2D-3D matches are pruned during pose estimation. In addition, by avoiding too many descriptor computations and kd-tree queries all at once, large fluctuations in the per-frame processing time are prevented. With lower per-frame latency, keypoints with known 3D point correspondences are typically tracked over longer sequences. This higher efficiency in tracking amortizes the cost of the relatively more expensive feature matching step, by requiring the matching to be invoked less frequently over longer periods of time.

In view of the foregoing and in reference to FIG. 1, one general embodiment of image-based localization involves computing the 3D position and 3D orientation of a video camera used to capture sequential image frames of an environment, for which a three dimensional reconstruction (3DR) has been pre-computed, to identify 3D points in the environment that correspond to two dimensional (2D) points in previously-captured images. This is accomplished using a computer to perform the following process actions. First, an indexed database is constructed (process action 100). This indexed database includes multiple representative database descriptors for each 3D point in the 3D reconstruction, each of which is computed at different scales from multiple ones of previously-captured environmental images.

Once the indexed database is constructed, image frames are input from the video camera as they are captured (process action 102). For each frame input the following actions are performed. First, tracked keypoints are identified which represent 2D image frame locations in the image frame (process action 104). These tracked keypoints are either newly added or previously depicted and identified in one or more previously-input image frames, as will be described in more detail later. A database descriptor is then computed for each newly added tracked keypoint identified in the image frame under consideration (process action 106). The tracked keypoints previously depicted and identified in one or more previously-input image frames already have a previously-computed database descriptor associated therewith. The aforementioned database descriptors are of the same type as those computed for the indexed database, and will be described in more detail later. Next, 3D points are identified in the 3D reconstruction of the environment that correspond to the tracked keypoints (process action 108). This identification of the 3D points involves, for each tracked keypoint, matching the database descriptor computed for the tracked keypoint to one or more descriptors in the indexed database and determining the 3D point associated with the matched database descriptors, as also will be described in more detail later. Finally, the 3D position and 3D orientation of the video camera are estimated (process action 110). This last action will be described in more detail in the descriptions to follow as well.

The foregoing features will now be described in more detail starting with the pre-computed aspects of the image-based localization technique embodiments described herein, and followed by a description of the image-based localization stage itself.

1.1 The Pre-Computed Aspects

Both an indexed database and a look-up table are pre-computed before the image-based localization begins. These precomputed aspects will now be described in more detail.
1.1.1 Indexed Database Construction In one embodiment, the aforementioned 3DR is generally a scene reconstruction in a global coordinate system, which is computed using a structure from motion (SFM) procedure on an input sequence. This input sequence consists of calibrated images of the environment, a 3D point cloud and a set of 2D-3D matches that encode the views from which a particular 3D point was triangulated during SFM. The calibrated images are used to build the indexed database, which in one embodiment is made up of database feature descriptors for the 3D points, and a kd-tree index that is constructed over the descriptors to support efficient approximate nearest neighbor (ANN) queries during feature matching. To avoid having to extract scale invariant keypoints during online computation, multiple database descriptors are computed and stored for each 3D point corresponding to keypoints detected across a range of scales. In one embodiment, the aforementioned keypoints are identified using a Harris corner detector at multiple scales. More particularly, multi-scale Gaussian image pyramids are computed (e.g., a pyramid having two octaves and four sub-octaves) and Harris corners are detected in all levels of the pyramids. At each keypoint, its orientation is computed by finding a peak in a gradient orientation histogram, and a rotation invariant DAISY descriptor is computed from a re-sampled patch at the computed orientation. Each database descriptor is then defined as a DAISY descriptor plus the associated orientation. In one tested embodiment, T2-8a-2r6s DAISY descriptors are computed for each keypoint using principal component analysis (PCA) to reduce the dimensions to 32.

In one embodiment, the 3D points in the 3DR map are next projected into the images they were triangulated from during SFM. For each keypoint in a particular pyramid level of an image, the closest point amongst all the 2D projections of the 3D points corresponding to that image is identified. If the closest point is within a threshold of $\tau$ pixels (where the distance is computed in the appropriate pyramid level), that keypoint and its database descriptor is assigned to the corresponding 3D point. This computation is performed for each image pyramid to generate all the descriptors for the 3D points in the 3DR map. It is noted that in one embodiment $\tau$ was set to 2.0 pixels.

Having multiple descriptors for each 3D point has an associated overhead in storage. However, the redundancy in this representation allows keypoints extracted at a fixed scale during online localization to be matched to a set of descriptors in the database, as long as one of the descriptors in this set was extracted at a similar scale. In addition, using multiple descriptors per 3D point is advantageous for ANN queries during feature matching.

The database descriptors are also labeled with their corresponding image indices, and the mapping between the descriptors and the corresponding 3D points is saved in a lookup table. This makes retrieving 3D points corresponding to the descriptors in the database very efficient. In one embodiment, the point retrieval is further optimized by grouping the images into overlapping clusters based on the pose of the camera used to capture them and use these clustered groups to perform preliminary place recognition, as described in more detail later.

Figure 2:
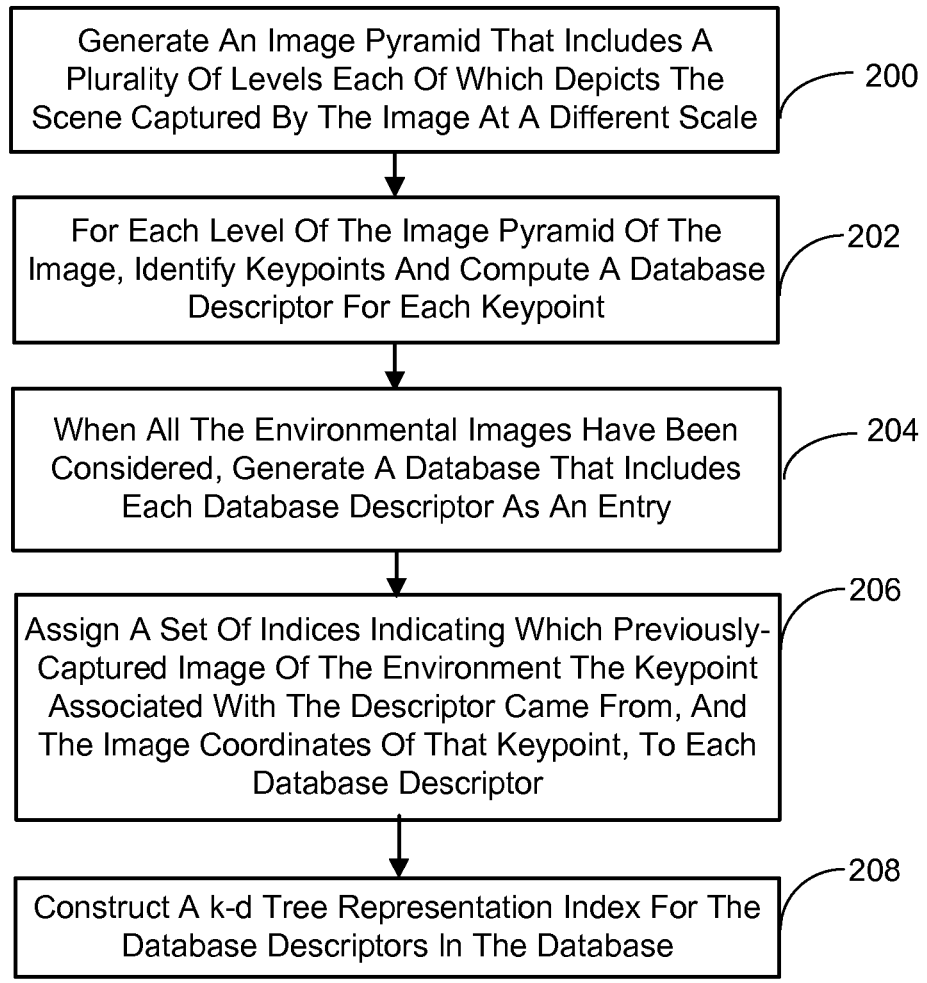
FIG. 2 is a flow diagram generally outlining one embodiment of a process for constructing an indexed database.

In view of the foregoing and in reference to FIG. 2, one general embodiment of constructing an indexed database involves, for each of the previously-captured and calibrated images of the environment, first generating an image pyramid that includes a plurality of levels, each of which depicts the scene captured by the image at a different scale or image resolution (process action 200). Then, for each level of the image pyramid of the image, keypoints are identified and a database descriptor is computed for each identified keypoint (process action 202). When all the environmental images have been considered, a database is generated that includes each database descriptor as an entry (process action 204). An index indicating which previously-captured image of the environment the keypoint associated with the descriptor came from is then assigning to each database descriptor (process action 206). Next, a k-d tree representation index is constructed for the database descriptors in the database (process action 208).

Figure 3:
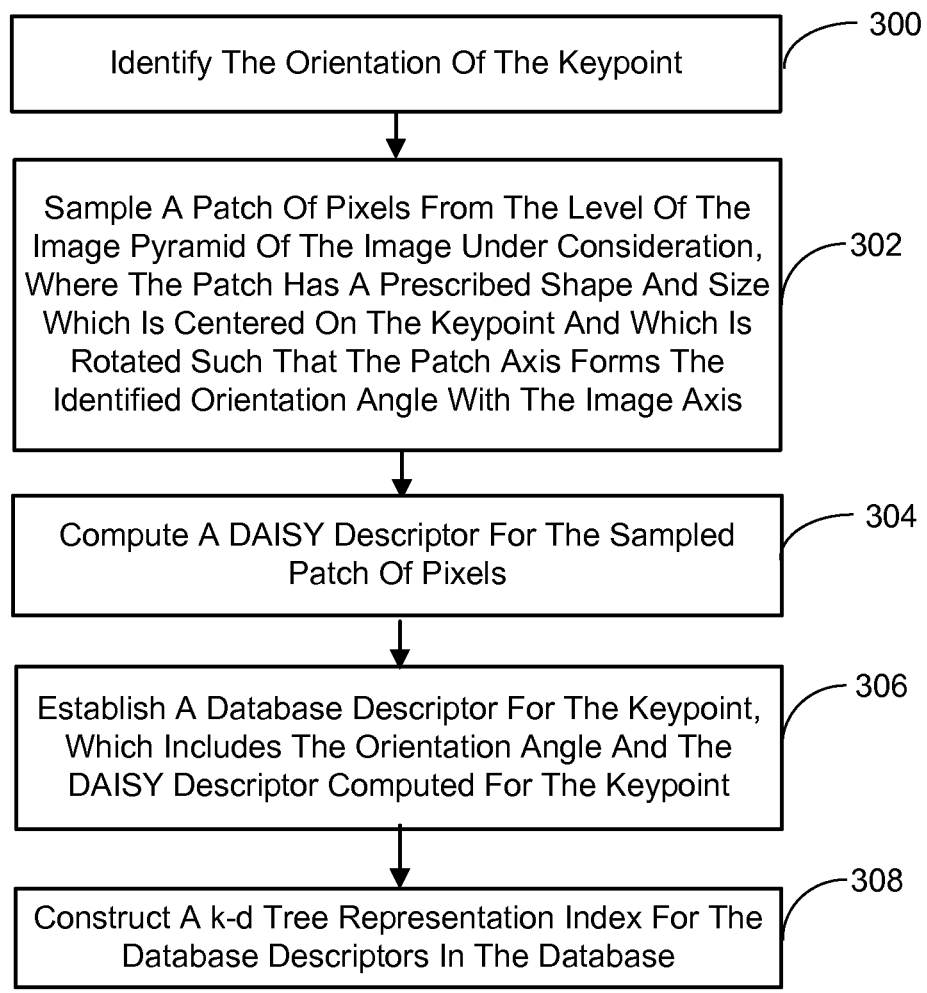
FIG. 3 is a flow diagram generally outlining one embodiment of a process for computing a database descriptor for each identified keypoint at each level of an image pyramid of an image.
Figure 4:
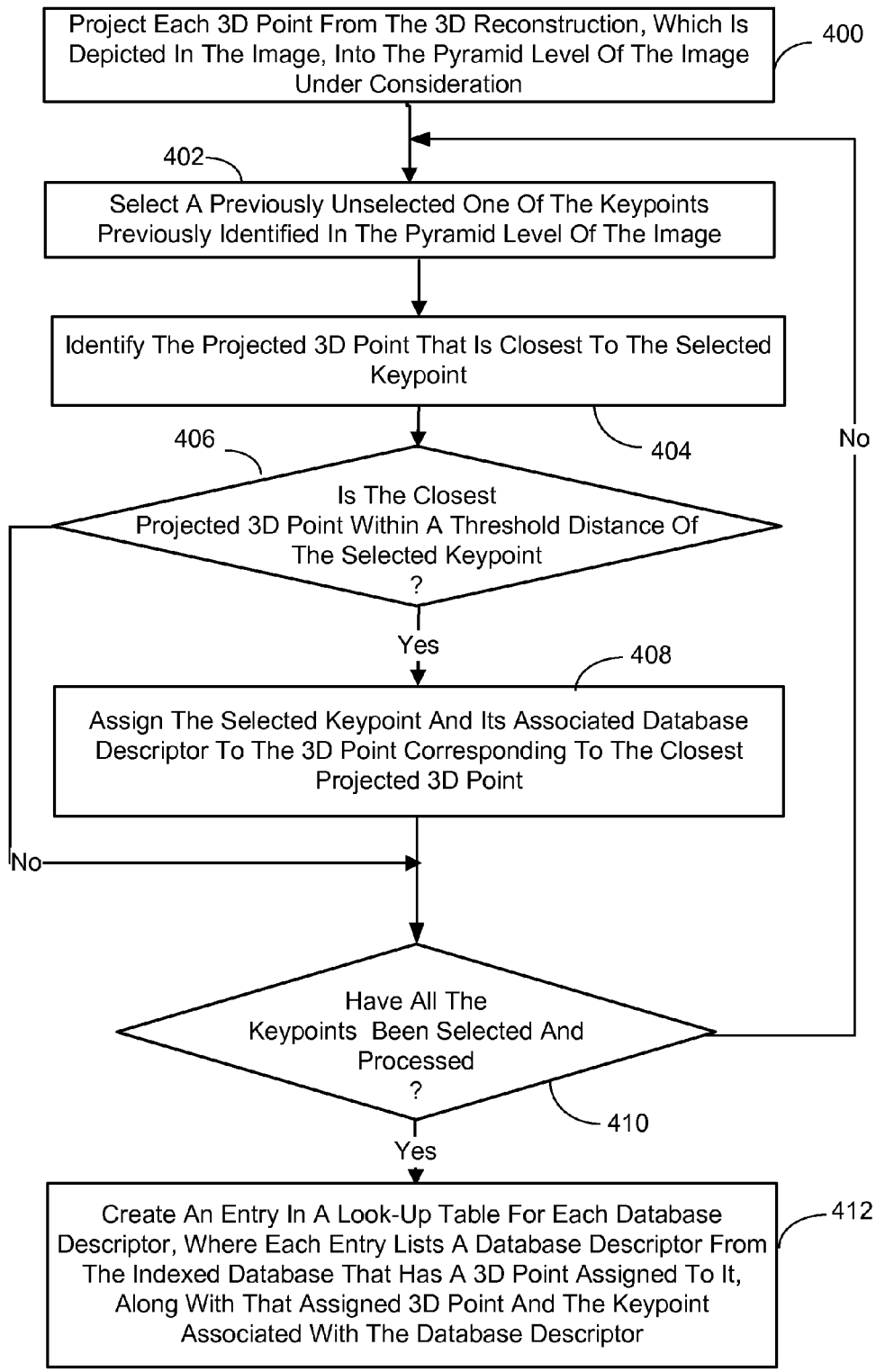
FIG. 4 is a flow diagram generally outlining one embodiment of a process for generating a look-up table that maps between each database descriptors and its corresponding 3D point in the 3DR for a level of the image pyramid of a previously-captured image of the environment.

With regard to computing a database descriptor for each identified keypoint at each level of the image pyramid of an image and in reference to FIG. 3, one general embodiment for accomplishing this task is as follows. First, the orientation of the keypoint is identified (process action 300). One way of doing this is to find a peak in a gradient orientation histogram of a prescribed sized pixel patch surrounding the keypoint, and then defining the keypoint's orientation in terms of an angle of rotation of a prescribed patch axis about the keypoint from a prescribed image axis. Next, a patch of pixels is sampled from the level of the image pyramid of the image under consideration, where the patch has a prescribed shape and size which is centered on the keypoint and which is rotated such that the patch axis forms the identified orientation angle with the image axis (process action 302). It is noted that the shape and size of the sampled patch can be the same or different from the patch used to identify the keypoint orientation. A DAISY descriptor is then computed for the sampled patch of pixels (process action 304). Finally, a database descriptor is established for the keypoint, which includes the orientation angle and the DAISY descriptor computed for the keypoint (process action 306).
1.1.2 Lookup Table Generation As mentioned previously, a mapping between each database descriptors and its corresponding 3D point in the 3DR is saved in a lookup table. With regard to this and in reference to FIG. 4, one general embodiment involves the following for each level of the image pyramid of each previously-captured image of the environment. First, each 3D point from the 3D reconstruction, which is visible in the image, is projected into the pyramid level of the image under consideration (process action 400). It is noted that the visibility information is obtained from the aforementioned SFM computation which computes the 3D point cloud but also outputs visibility information for each point in the cloud. Next, a previously unselected one of the keypoints previously identified in the pyramid level of the image is selected (process action 402). The projected 3D point that is closest to the selected keypoint is then identified (process action 404), and it is determined if the identified closest projected 3D point is within a threshold distance (e.g., 2 pixels at the pyramid level under consideration) of the selected keypoint (process action 406). Whenever it is determined that the identified closest projected 3D point is within the threshold distance, the selected keypoint and its associated database descriptor is assigned to the 3D point corresponding to the closest projected 3D point (process action 408). If not, this last action is skipped. It is then determined if all the keypoints previously identified in the pyramid level of the image under consideration have been selected and processed (process action 410). If not, process actions 402 through 410 are repeated as appropriate. Once all the aforementioned keypoints have been selected and processed, the procedure continues by creating an entry in a look-up table for each database descriptor, where each entry lists a database descriptor from the indexed database that has a 3D point assigned to it, along with that assigned 3D point and the keypoint associated with the database descriptor (process action 412). It is noted that the foregoing process will ultimately result in multiple database descriptors being mapped to the same 3D point owing to the plurality of pyramid levels associated with each image, and because multiple overlapping images are typically used for the 3D reconstruction.

As also mentioned previously, in one embodiment, the pre-computed aspects include grouping the previously-captured images of the environment into overlapping clusters based on the pose of the camera used to capture them. In large scenes, matching 3D points becomes more difficult due to greater ambiguity in feature descriptors. A query descriptor in an image could match descriptors for several different 3D points, which are similar in appearance. To address this, a coarse location recognition procedure is employed to filter as many incorrect 2D-3D matches as possible during the image-based localization stage. As a result, fewer random sample consensus (RANSAC) hypotheses will be required during robust pose estimation as will become apparent shortly, making that process more efficient.

The coarse place recognition action generally involves offline clustering of the previously-captured images of the environment based on the pose of the camera used to capture them. Sometimes this is referred to as clustering "cameras" into location classes. In this clustering, images with many SFM-obtained points in common are grouped into the same cluster. Generally, an approach is used which iterates between finding a disjoint partition of the "cameras" by analyzing the feature match graph used by SFM, and growing the clusters locally by including "cameras" from neighboring clusters to improve the coverage of 3D points. Given the pre-computed clusters, in the image-based localization phase, the most likely location class is selected using a simple voting scheme over the set of matching descriptors in the database returned by the ANN query on the image descriptors. Matched descriptors that correspond to 3D points that do not belong to the selected location cluster are removed.

Figure 5:
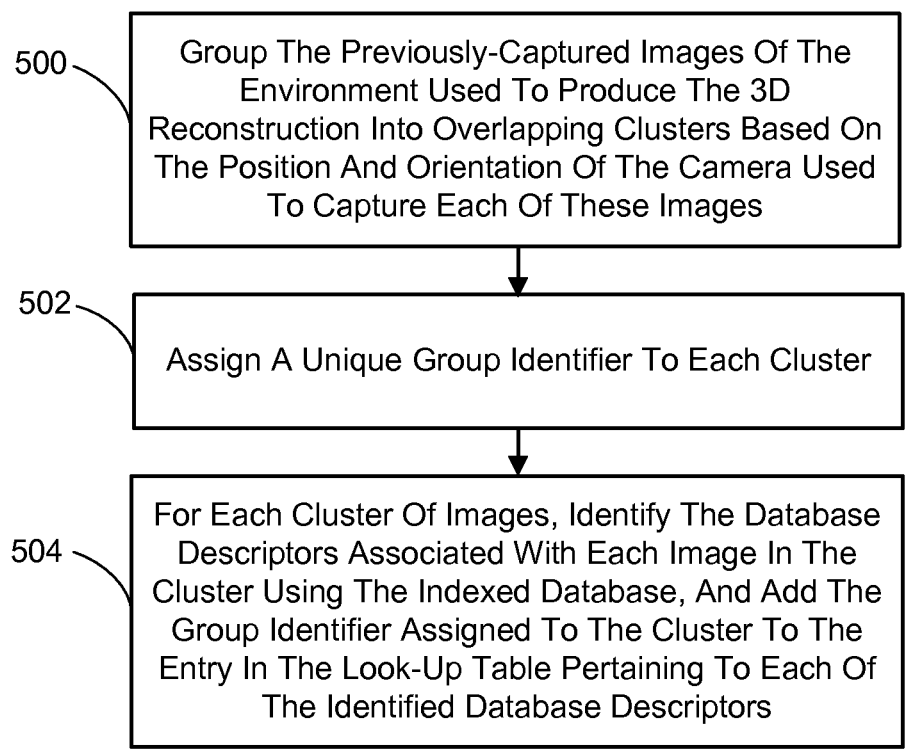
FIG. 5 is a flow diagram generally outlining one embodiment of a process for adding a unique cluster group identifier to the entry in the look-up table pertaining to each of the identified database descriptors, where the cluster group identifier indicates which group of overlapping clusters of the previously-captured environmental images the descriptor belongs to based on the 3D position and 3D orientation of the camera used to capture each of the images.

In view of the foregoing and in reference to FIG. 5, one general embodiment of constructing the look-up table, further involves first grouping the previously-captured images of the environment used to produce the 3D reconstruction into overlapping clusters based on the 3D position and 3D orientation of the camera used to capture each of these images (process action 500). Next, a unique group identifier is assigned to each cluster (process action 502). Then, for each cluster of images, the database descriptors associated with each image in the cluster are identified using the indexed database, and the group identifier assigned to the cluster is added to the entry in the look-up table pertaining to each of the identified database descriptors (process action 504).

1.2 Image-Based Localization Process

In this section, embodiments of a process for image-based localization are presented which employ the pre-computed indexed database and lookup table. As will be seen this image-based localization includes an approach to 2D keypoint tracking, a guided matching procedure that is interleaved with keypoint tracking, and a global matching procedure that is used when there are too few known 2D-3D matches. Finally, pose estimation and filtering is described.

1.2.1 Keypoint Tracking

As indicated previously, for each consecutive image frame input during the image-based localization process, keypoints are identified in the current image frame and identified in one or more previously-input image frames. In this way, identified keypoints are tracked from frame to frame.

More particularly, in one embodiment, to track keypoints, Harris corners are extracted in the current frame. Corners having a cornerness value greater than an adaptive contrast-sensitive threshold are designated as keypoints. It is noted that cornerness refers to a quantity that is defined in the well known Harrison Corner Extraction algorithm. In one embodiment, the adaptive threshold is set to $\gamma \tilde{r}$ where $\tilde{r}$ is the maximum cornerness of keypoints in the previous frame and $\gamma=0.001$. Next, for a $\mu \times \mu$ pixel, square patch around each keypoint, a 256-bit Binary Robust Independent Elementary Feature (BRIEF) descriptor is computed. BRIEF descriptors lack rotational and scale invariance, but can be computed very fast. The tracked keypoints from the prior frame are compared to all the keypoint in the current frame, within a $\rho \times \rho$ search window around its respective positions in the prior frame. BRIEF descriptors are compared using Hamming distance (computed with bitwise XOR followed bit-counting using the parallel bit-count algorithm), and the best is accepted as a match, when the ratio between the best and second-best match is less than $\psi$. In one embodiment, $\mu=32$, $\rho=48$ and $\psi=0.8$. It is noted that no geometric verification is performed during tracking. Rather as will be described later, the subsequent RANSAC based pose estimation step handles outliers.

Figure 6A:
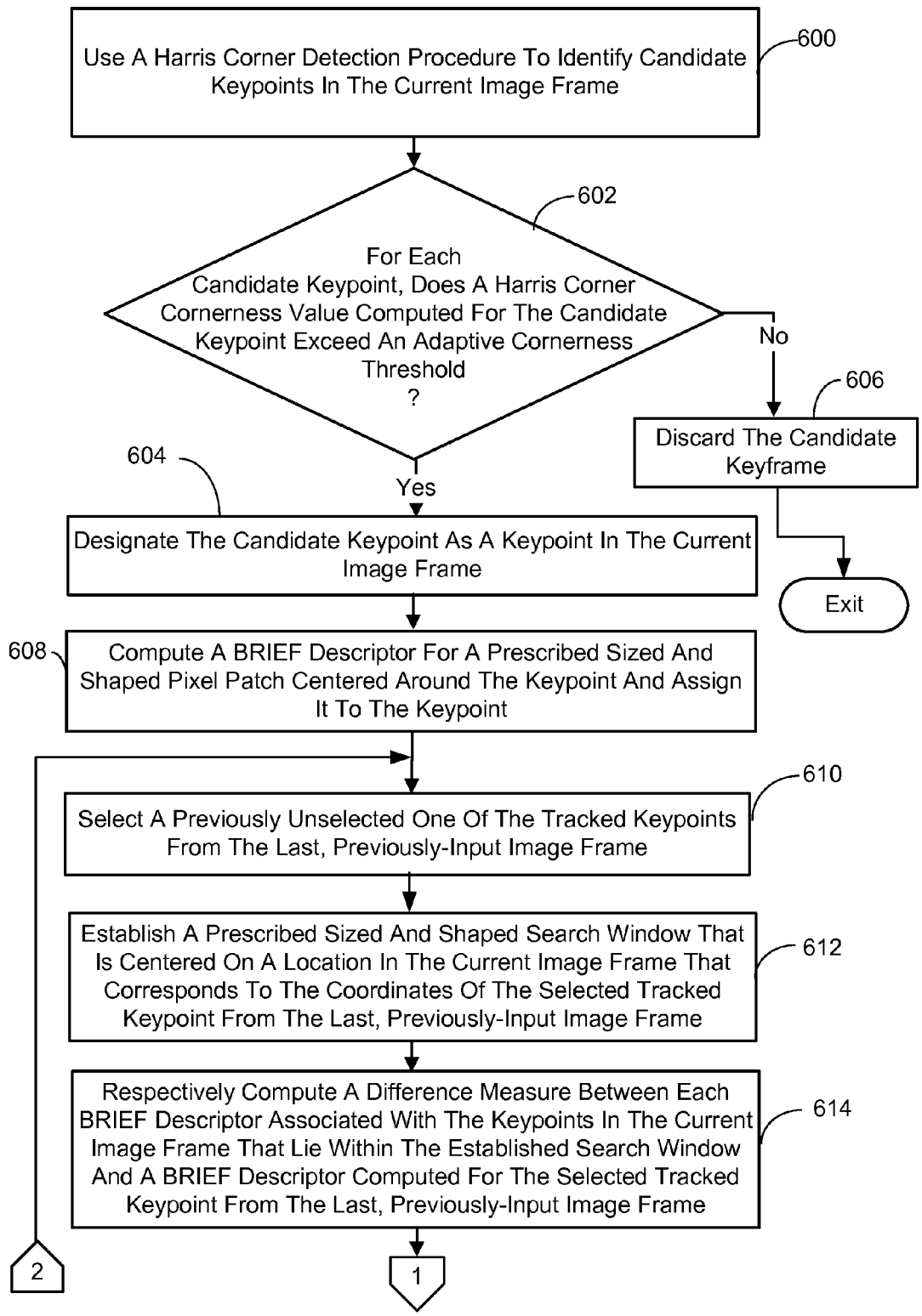
FIGS. 6A-B is a flow diagram generally outlining one embodiment of a process for tracking keypoints across successive video frames.
Figure 6B:
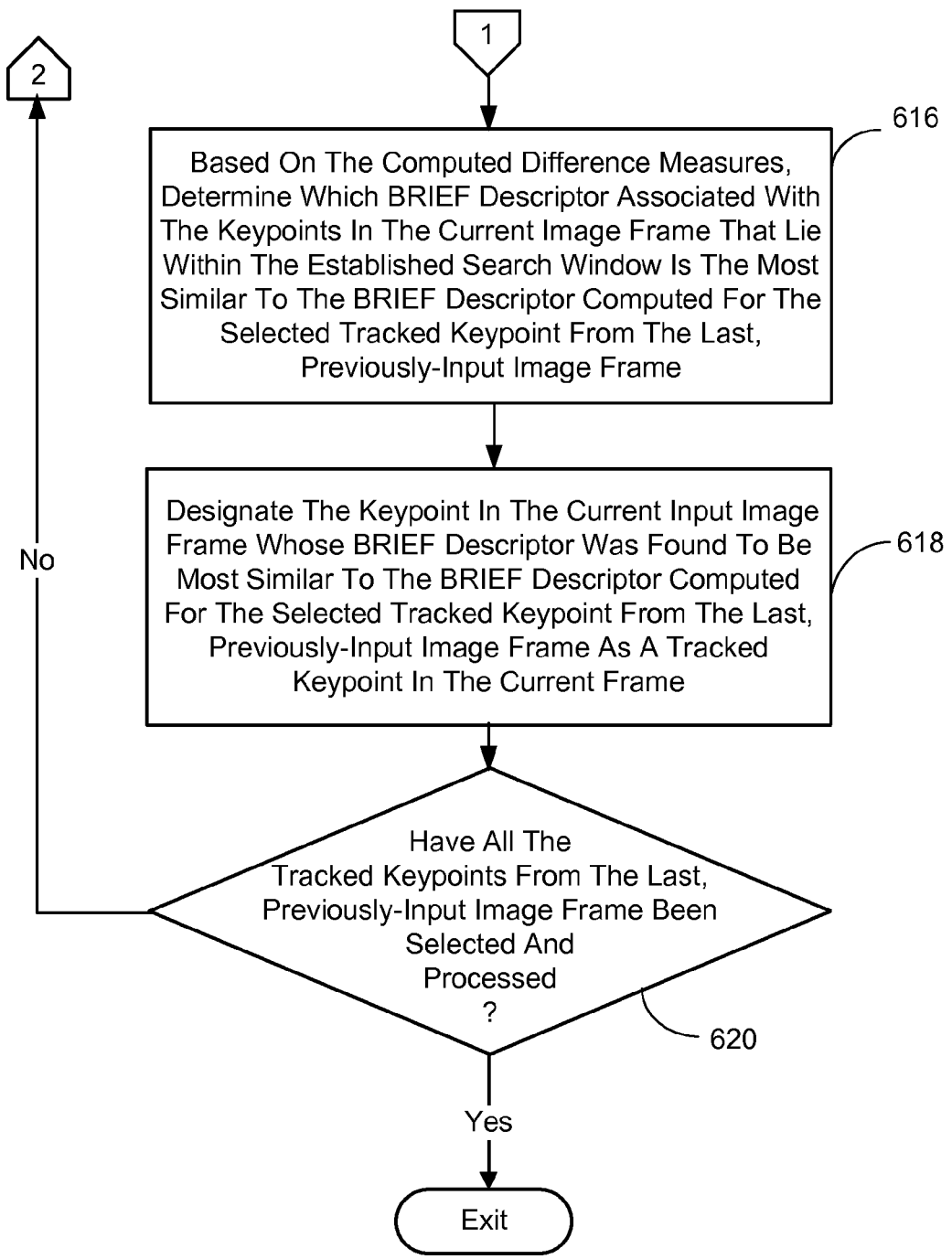

In view of the foregoing and in reference to FIGS. 6A-B, one general embodiment of tracking keypoints across image frames involves as indicated previously using a Harris corner detection procedure to identify candidate keypoints in the current image frame (process action 600). Next, for each candidate keypoint, it is determined whether a Harris corner cornerness value computed for the candidate keypoint exceeds an adaptive cornerness threshold (process action 602). As indicated previously, in one embodiment, the adaptive cornerness threshold is defined as a prescribed percentage (e.g., 0.1%) of the maximum cornerness value in the last, previously-input image frame. If it is determined that a candidate keypoint has a Harris corner cornerness value that exceeds the adaptive cornerness threshold, then it is designated as a keypoint in the current image frame (process action 604). If not, the candidate keypoint is discarded (process action 606). A BRIEF descriptor is then computed for a prescribed sized and shaped pixel patch centered around the keypoint and assigned to the keypoint (process action 608). A previously unselected one of the tracked keypoints from the last, previously-input image frame is then selected (process action 610). It is noted that there will not be any for the first frame. A prescribed sized and shaped search window that is centered on a location in the current image frame that corresponds to the coordinates of the selected tracked keypoint from the last, previously-input image frame, is established (process action 612). A difference measure (e.g., a Hamming distance) is then respectively computed between each BRIEF descriptor associated with the keypoints in the current image frame that lie within the established search window and a BRIEF descriptor computed for the selected tracked keypoint from the last, previously-input image frame (process action 614). Next, based on the computed difference measures, it is determined which BRIEF descriptor associated with the keypoints in the current image frame that lie within the established search window is the most similar to the BRIEF descriptor computed for the selected tracked keypoint from the last, previously-input image frame (process action 616). The keypoint in the current input image frame whose BRIEF descriptor was found to be most similar to the BRIEF descriptor computed for the selected tracked keypoint from the last, previously-input image frame is designated as a tracked keypoint in the current frame (process action 618). The designated tracked keypoint corresponds to the selected tracked keypoint from the last, previously-input image frame, and so is associated with the same database descriptor as that tracked keypoint. It is then determined if all the tracked keypoints from the last, previously-input image frame have been selected and processed (process action 620). If not, process actions 610 through 620 are repeated. Otherwise, the process ends.

It is noted that in an alternate embodiment, instead of directly designating the keypoint in the current input image frame whose BRIEF descriptor was found to be most similar to the BRIEF descriptor computed for the selected tracked keypoint as a tracked keypoint in the current frame, the following procedure is employed. First, a ratio of the Hamming distance computed for the current image frame keypoint BRIEF descriptor determined to be most similar to the BRIEF descriptor computed for the selected tracked keypoint to the Hamming distance computed for the current image frame keypoint BRIEF descriptor representing the second most similar to the BRIEF descriptor computed for the selected tracked keypoint, is computed. If the computed ratio is less than a prescribed number (e.g., 0.8), then the current image frame keypoint whose BRIEF descriptor was determined to be most similar to the BRIEF descriptor computed for the selected tracked keypoint is designated as a tracked keypoint. However, if the ratio is greater than the prescribed number, then the current image frame keypoint whose BRIEF descriptor was determined to be most similar to the BRIEF descriptor computed for the selected tracked keypoint is not designated as a tracked keypoint.

1.2.2 Tracking Table Generation

Figure 7:
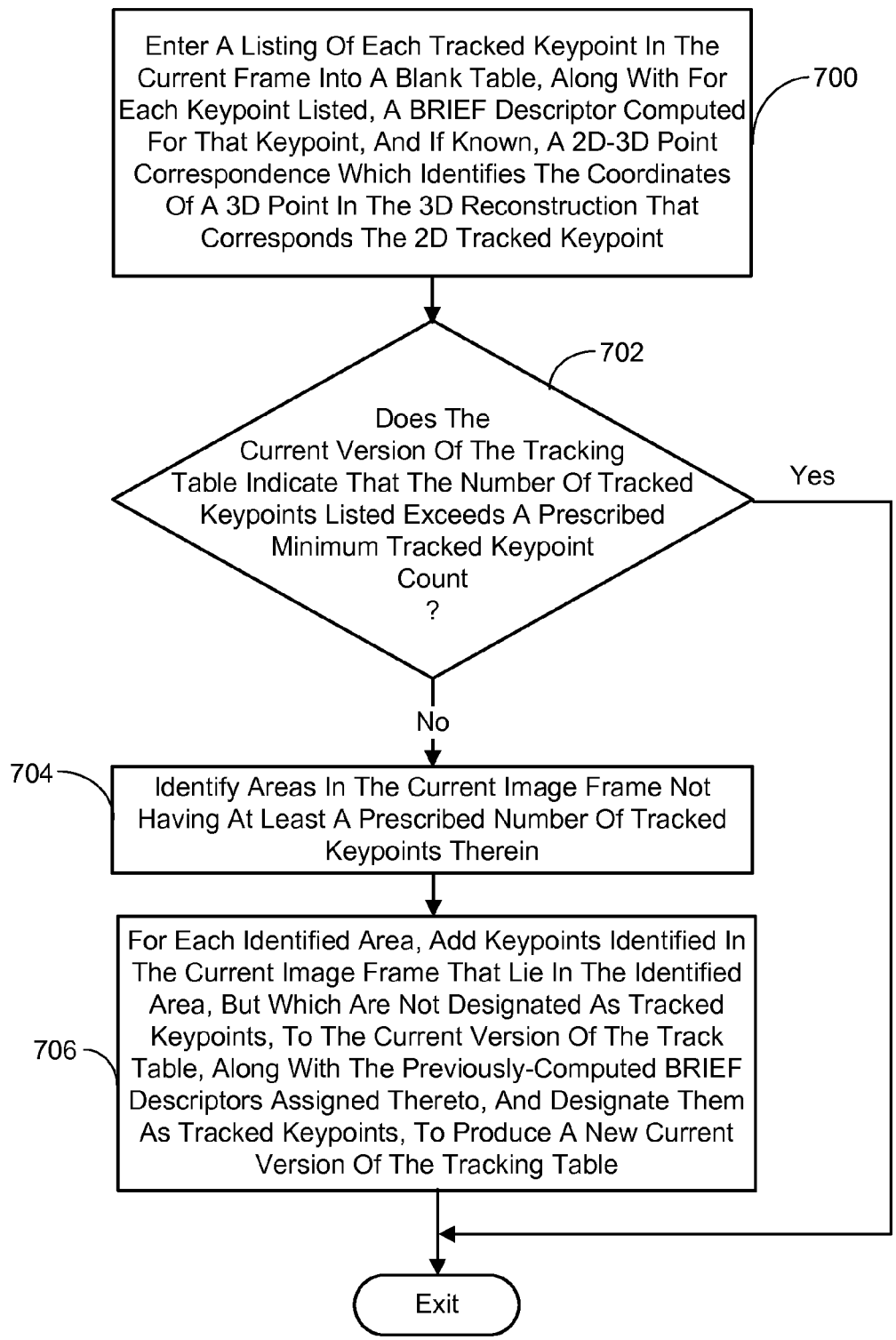
FIG. 7 is a flow diagram generally outlining one embodiment of a process for generating a current version of a tracking table listing each tracked keypoint in the current frame, along with, for each keypoint listed, a binary feature descriptor (such as a BRIEF descriptor) computed for that keypoint, and if known, a 2D-3D point correspondence which identifies the coordinates of a 3D point in the 3D reconstruction that corresponds the 2D tracked keypoint.

Once the tracked keypoints in the current image frame have been identified, a current version of a tracking table is generated. Referring to FIG. 7, in one embodiment this tracking table is generated as follows. First, a listing of each tracked keypoint in the current frame is entered into a blank table, along with, for each keypoint listed, a BRIEF descriptor computed for that keypoint, and if known, a 2D-3D point correspondence which identifies the coordinates of a 3D point in the 3D reconstruction that corresponds the 2D tracked keypoint (process action 700). It is noted that the track table remains empty for the first frame. It is then determined if the current version of the tracking table indicates that the number of tracked keypoints listed exceeds a prescribed minimum number of tracked keypoints with valid 2D-3D correspondences (process action 702). In one embodiment, this prescribed tracked keypoint count is set at 25. If the tracked keypoint count does not exceed the prescribed minimum tracked keypoint count, then an add-features procedure is implemented. More particularly, areas in the current image frame not having tracked keypoints are identified (process action 704). For example, the features found in the image (e.g., Harris corner) used to identify a keypoint have an associated pixel region (e.g., 9×9 pixels). Thus, by masking the image with these regions associated with the tracked keypoints, unmasked areas are identified. For each identified unmasked area, keypoints identified in the current image frame that lie in the identified area, but which are not designated as tracked keypoints, are added to the current version of the track table, along with the previously-computed BRIEF descriptors assigned thereto, and designated as tracked keypoints, to produce a new current version of the tracking table (process action 706). On the other hand, if the tracked keypoint count does exceed the prescribed minimum tracked keypoint count, then the current version of the tracking table is not changed. It is noted that in one embodiment, a maximum limit (e.g., 800) is imposed on how many keypoints can be added in one frame. It is further noted that for the first frame there will be no tracked keypoints, so as many keypoints as are found in that frame will be designated as tracked keypoints and added to the tracking table, up to the prescribed maximum limit (if a limit is imposed).

1.2.3 Database Descriptor Computation

In addition, once the tracked keypoints in the current image frame have been identified, a database descriptor is computed for each tracked keypoint that does not already have such a descriptor computed for it. In other words, a database descriptor is computed for each newly added tracked keypoint. These database descriptors are of the same type as those computed for the indexed database.

1.2.4 2D-3D Point Correspondence Tallying

Figure 8:
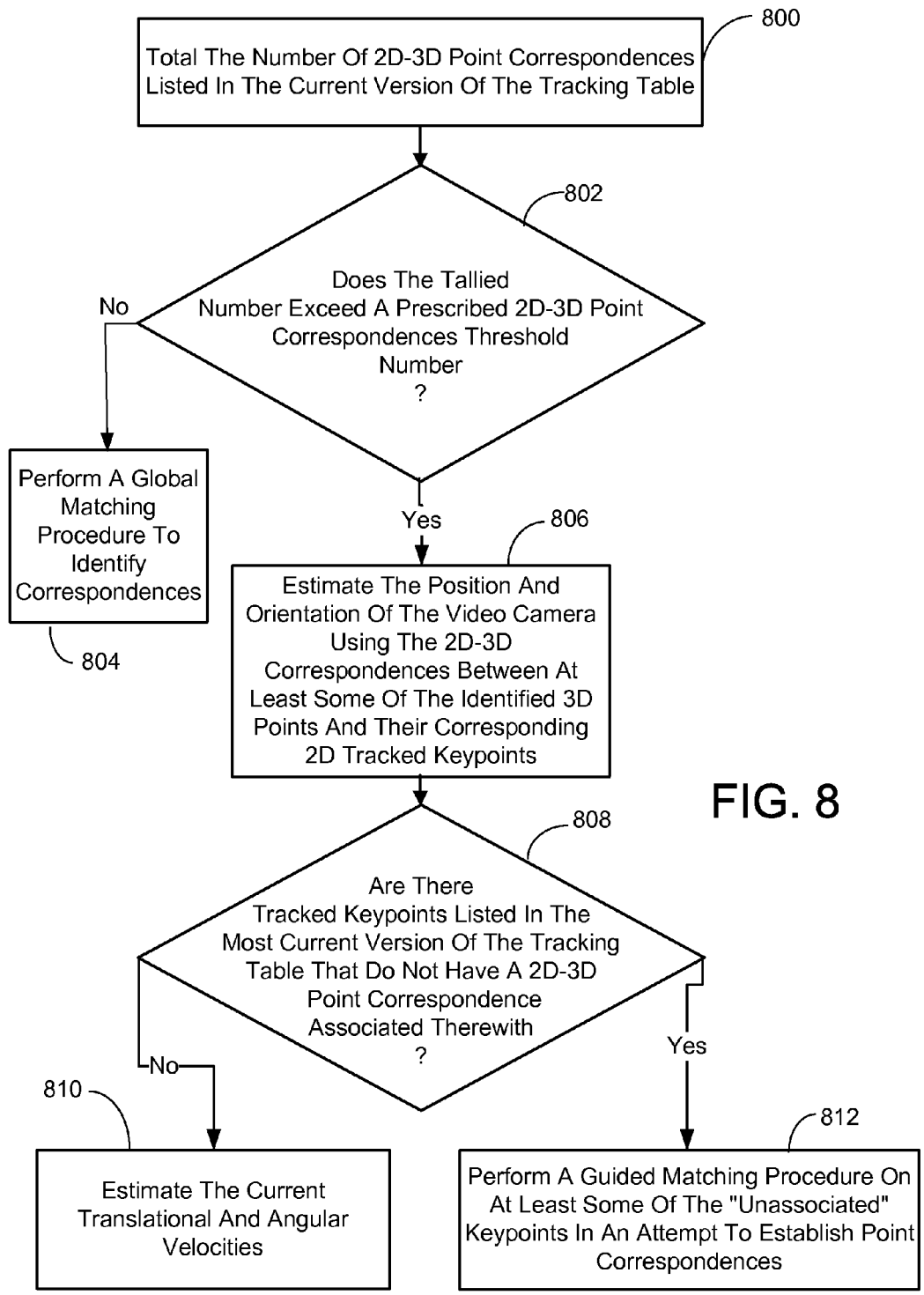
FIG. 8 is a flow diagram generally outlining one embodiment of a process for tallying 2D-3D point correspondences.
Figure 9A:
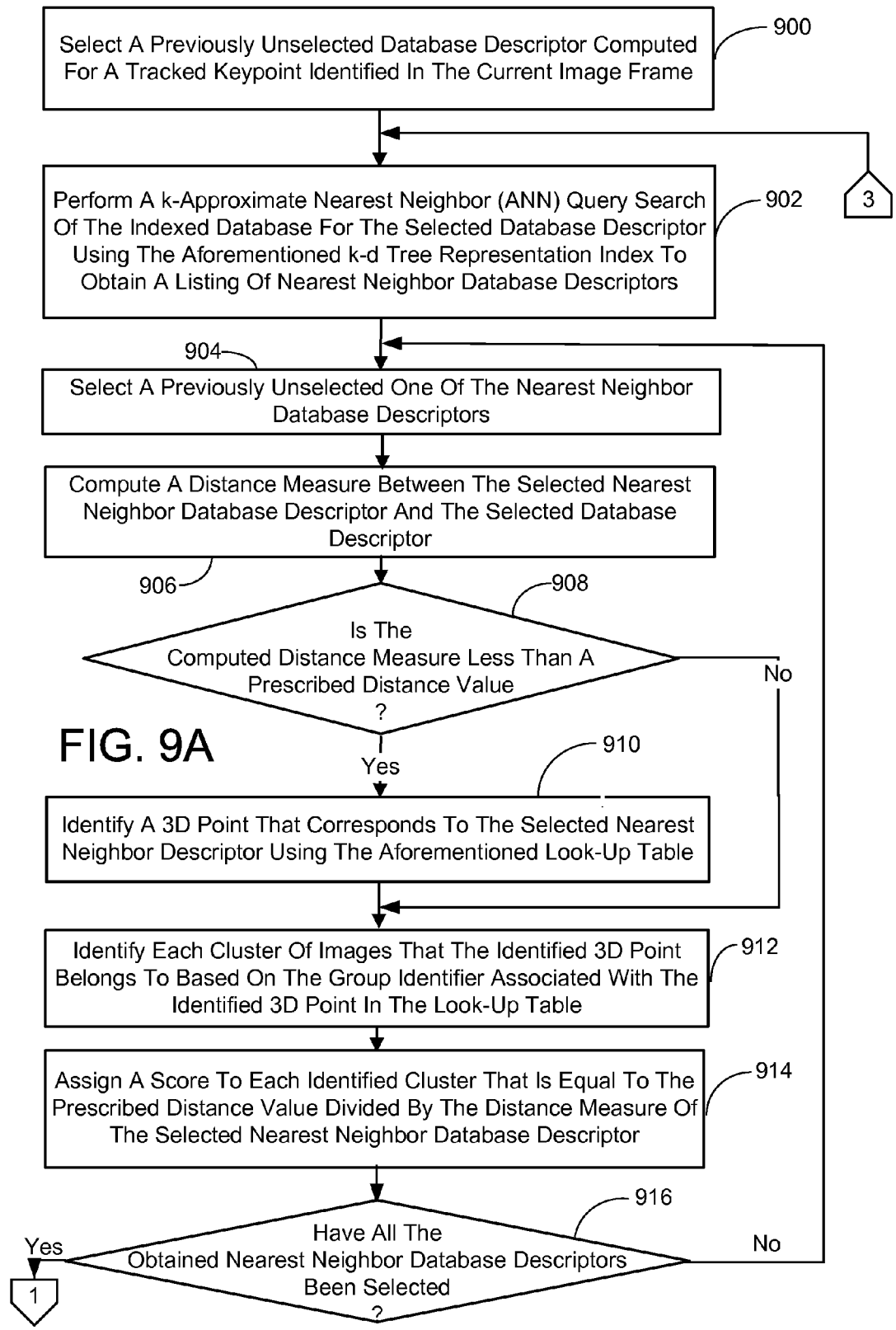
FIGS. 9A-D depict a flow diagram generally outlining one embodiment of a process for performing a global matching procedure.
Figure 9B:
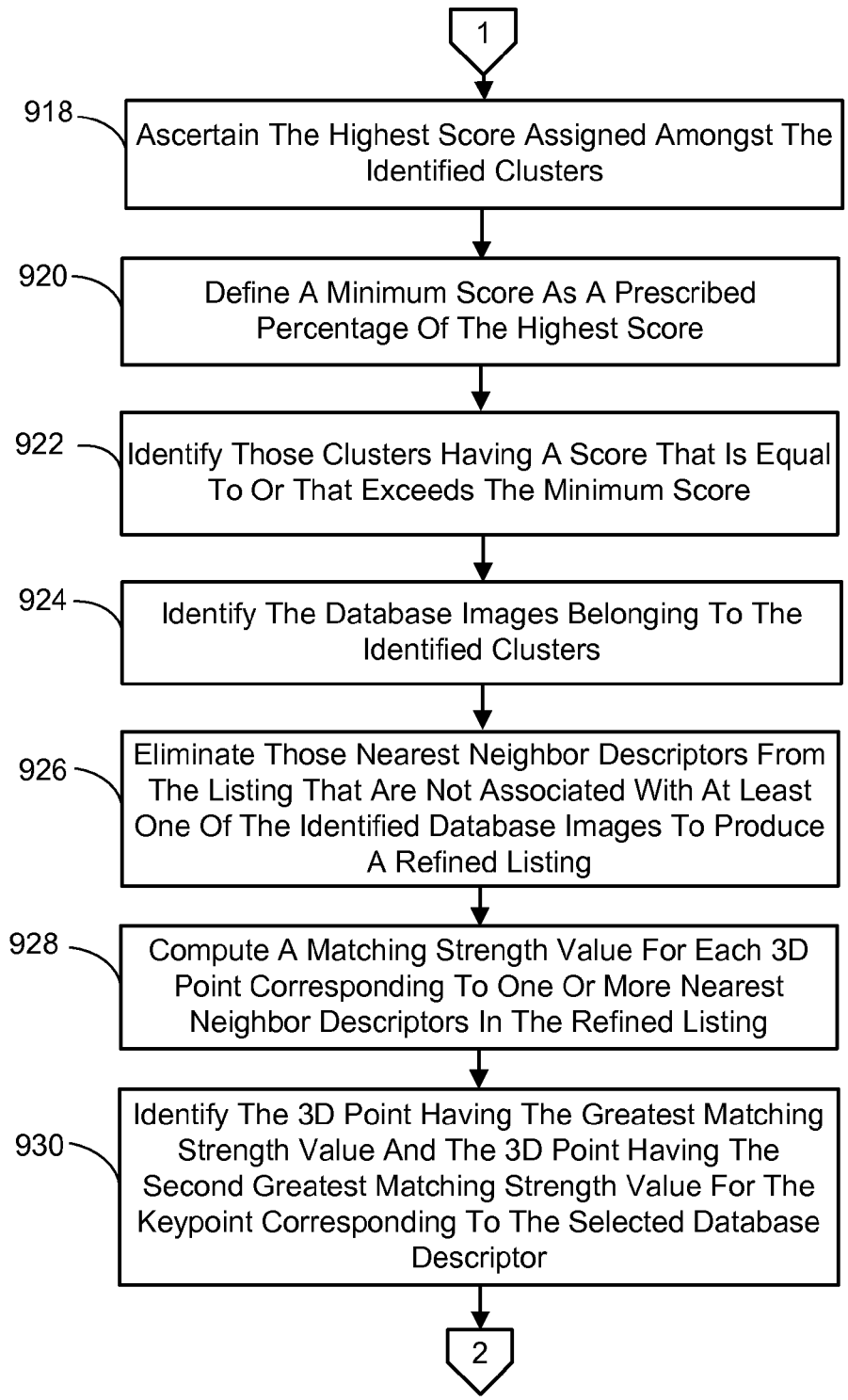
Figure 9C:
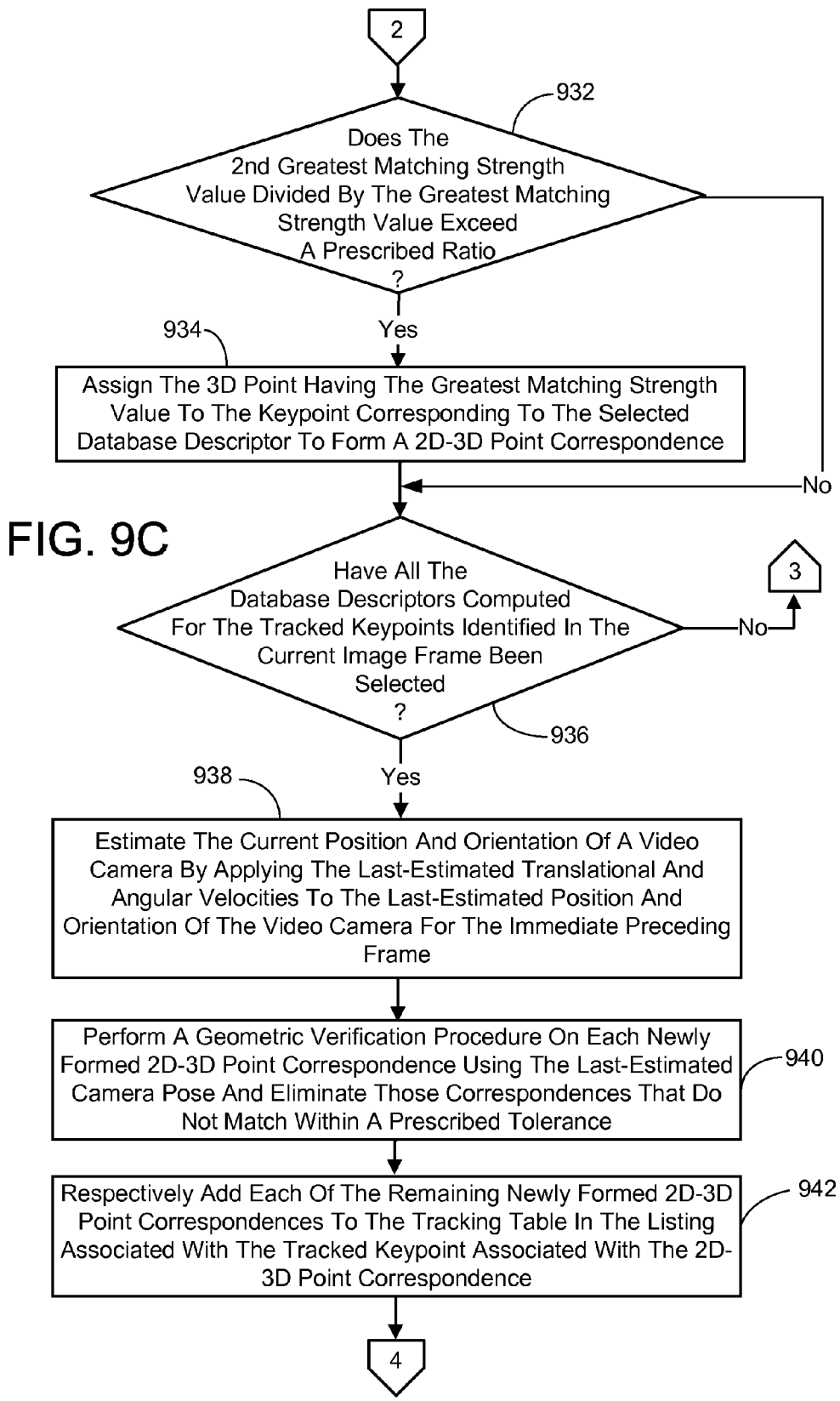
Figure 9D:
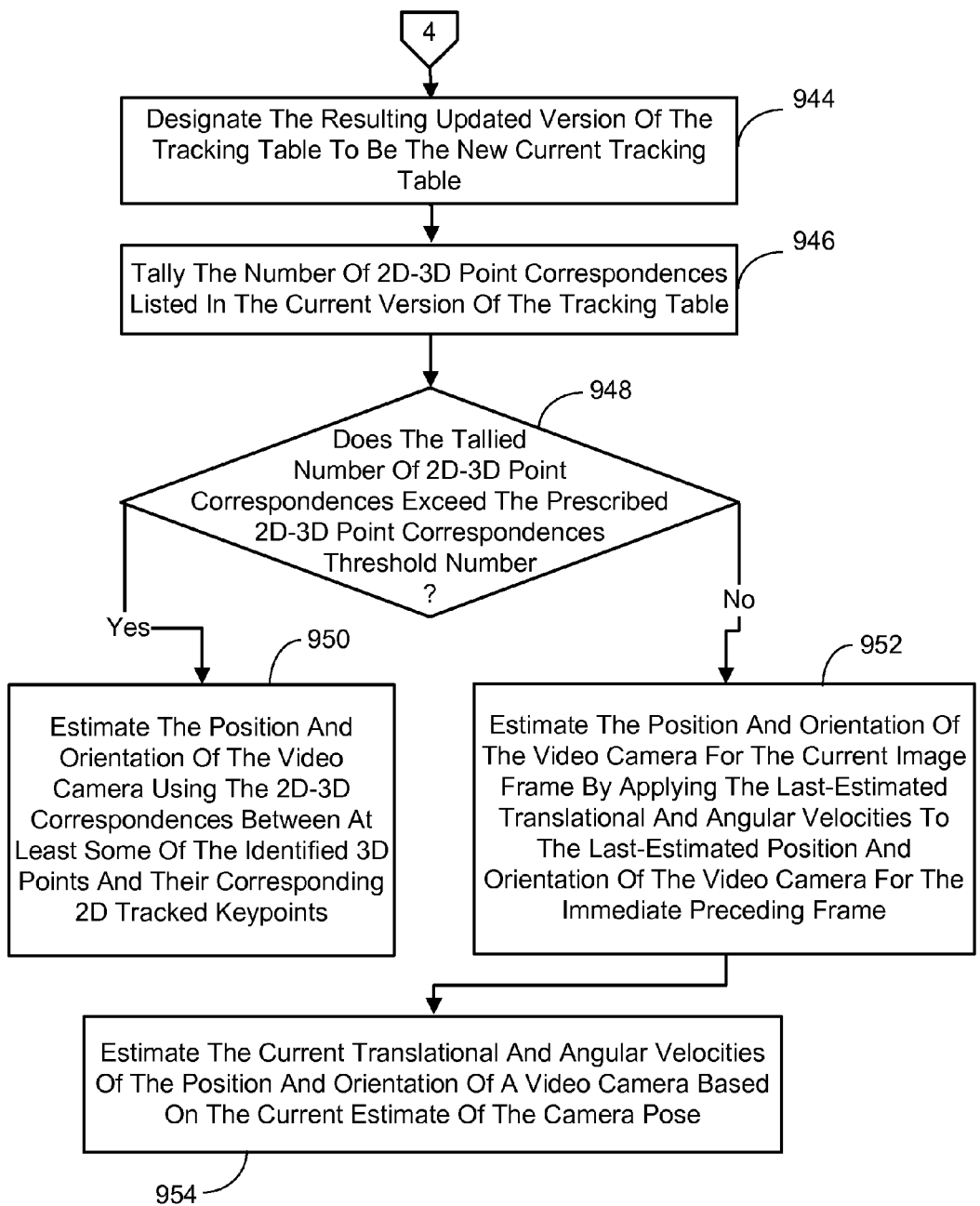

In one embodiment, the image-based localization process continues with a 2D-3D point correspondence tallying procedure using the current version of the tracking table. More particularly, referring to FIG. 8, first the number of 2D-3D point correspondences listed in the current version of the tracking table are totaled (process action 800). It is then determined, in process action 802, if the tallied number exceeds a prescribed 2D-3D point correspondences threshold number (e.g., 10). Whenever the tallied number does not exceed the prescribed 2D-3D point correspondences threshold number (which would apply to at least the first frame), a global matching procedure is performed to identify such correspondences (process action 804), as will be described shortly. However, if it is determined that the tallied number does exceed the prescribed 2D-3D point correspondences threshold number, then the 3D position and 3D orientation of the video camera is estimated using the 2D-3D correspondences between at least some of the identified 3D points and their corresponding 2D tracked keypoints (process action 806). This estimating procedure will also be described in more detail later.

Once the video camera pose has been estimated, it is next determined if there are tracked keypoints listed in the most current version of the tracking table that do not have a 2D-3D point correspondence associated therewith (process action 808). If not, then the current translational and angular velocities are updated (process action 810), which in one embodiment is achieved using a conventional Kalman filter update procedure.

On the other hand, if it is determined that there are tracked keypoints listed in the most current version of the tracking table that do not have a 2D-3D point correspondence associated therewith, then a guided matching procedure is performed on at least some of the "unassociated" keypoints in an attempt to establish point correspondences (process action 812), as will be described shortly.

1.2.5 Global Matching

With regard to the aforementioned global matching procedure, given 2D keypoints in an image and their corresponding DAISY descriptors denoted as $Q=\{q_i\}$, an attempt is made to retrieve a set of 3D point correspondences for them. For each descriptor $q_i$, a k-ANN query is performed based on priority search using a kd-tree, which retrieves approximate nearest neighbors $D_i=\{d_{ij}\}$ sorted by increasing distance $\{s_{ij}\}$, $j=1 \ldots k$, from $q_i$. For each neighbor $d_{ij}$, where $s_{ij} < \sigma s_{i0}$, the corresponding 3D point $X_{ij}$ is retrieved, and every cluster that $X_{ij}$ belongs to, receives a vote equal to its strength $s_{i0}/s_{ij}$ (i.e., because each 3D point could belong to multiple overlapping clusters). The highest score $\tilde{s}$ is found amongst the clusters, and the clusters having a score of at least $\beta\tilde{s}$ are identified. The set of images in the selected clusters is denoted as S, and in one embodiment, $k=50$, $\sigma=2.0$ and $\beta=0.8$.

The set of retrieved descriptors $D_i$ is filtered by retaining descriptors corresponding to the selected database images in S. Next, for each query $q_i$, a set of retrieved 3D points is computed, where a matching strength for each 3D point is obtained by summing the strengths of its corresponding descriptors $d_{ij}$, which were computed earlier. Finally, two set of matches are constructed. In one embodiment, the first set includes the best 3D point match for each keypoint, as long for that keypoint, the best two matches based on matching strength passes a ratio test with a threshold of 0.75. In one embodiment, the second set includes one-to-many 3D point matches, where for each keypoint all the matches with ratios greater than 0.75 are included. The two sets of matches are used for pose estimation. The first set is used for generating RANSAC hypotheses, whereas the second set is used in the verification step, as will be described shortly.

In view of the foregoing and in reference to FIGS. 9A-D, one general embodiment of performing the global matching procedure is as follows. A previously unselected database descriptor computed for a tracked keypoint identified in the current image frame is selected (process action 900). A k-approximate nearest neighbor (ANN) query search of the indexed database is then performed for the selected database descriptor using the aforementioned k-d tree representation index (e.g., k=50) to obtain a listing of nearest neighbor database descriptors (process action 902). A previously unselected one of the obtained nearest neighbor database descriptors is then selected (process action 904). A distance measure between the selected nearest neighbor database descriptor and the selected database descriptor is computed, where this distance measure increases in value the more the selected nearest neighbor database descriptor differs from the selected database descriptor (process action 906). It is then determined if the computed distance measure is less than a prescribed distance value (process action 908). If so, a 3D point is identified that corresponds to the selected nearest neighbor descriptor using the aforementioned look-up table (process action 910). If not, no action is taken. Next, each cluster of images that the identified 3D point belongs to is identified based on the group identifier associated with the identified 3D point in the look-up table (process action 912). A score is then assigned to each identified cluster that is equal to the prescribed distance value divided by the distance measure of the selected nearest neighbor database descriptor (process action 914). It is then determined if all the obtained nearest neighbor database descriptors have been selected and processed (process action 916). If not, process actions 904 through 916 are repeated as appropriate. However, if all the obtained nearest neighbor database descriptors have been selected and processed, then the highest score assigned amongst the identified clusters is ascertained (process action 918), and a minimum score is defined as a prescribed percentage (e.g., 0.8) of the highest score (process action 920). Those clusters having a score that is equal to or that exceeds the minimum score are identified (process action 922), and the database images belonging to the identified clusters are also identified (process action 924). Next, those nearest neighbor descriptors from the listing that are not associated with at least one of the identified database images are eliminated to produce a refined listing (process action 926). A matching strength value is then computed for each 3D point corresponding to one or more nearest neighbor descriptors in the refined listing (process action 928). In one embodiment, this matching strength value is computed as the summation of the scores of the nearest neighbor descriptors associated with the 3D point. The 3D point having the greatest matching strength value and the 3D point having the second greatest matching strength value are identified for the keypoint corresponding to the selected database descriptor (process action 930). It is then determined in process action 932 if the second greatest matching strength value divided by the greatest matching strength value for the 3D points exceeds a prescribed ratio value (e.g., 0.75). If so, the 3D point having the greatest matching strength value is assigned to the keypoint corresponding to the selected database descriptor to form a 2D-3D point correspondence (process action 934). If not, then no action is taken. It is then determined if all the database descriptors computed for the tracked keypoints identified in the current image frame have been selected and processed as described above (process action 936). If not, then process actions 900 through 936 are repeated as appropriate. When all the aforementioned database descriptors have been selected and processed, the current 3D position and 3D orientation of a video camera is estimated by applying the last-estimated translational and angular velocities to the last-estimated 3D position and 3D orientation of the video camera for the immediate preceding frame (process action 938). In addition, a geometric verification procedure is performed on each newly formed 2D-3D point correspondence using the last-estimated camera pose and those correspondences that do not match are eliminated from consideration (process action 940). More particularly, in one embodiment, a 3D point is deemed valid (and so not eliminated) if it projects using the last-estimated camera pose to within a prescribed number of pixels (e.g., 5) of the 2D pixel location in the frame under consideration. Each of the remaining newly formed 2D-3D point correspondences are then respectively added to the tracking table in the listing associated with the tracked keypoint associated with that 2D-3D point correspondence (process action 942), and the resulting updated version of the tracking table is designated to be the new current tracking table (process action 944).

Assuming at least one newly-formed 2D-3D point correspondences has been added to the tracking table, the process continues with tallying the number of 2D-3D point correspondences listed in the current version of the tracking table (process action 946). It is then determined if the tallied number of 2D-3D point correspondences exceeds the aforementioned prescribed 2D-3D point correspondences threshold number (process action 948). If so, the 3D position and 3D orientation of the video camera is estimated using the 2D-3D correspondences between at least some of the identified 3D points and their corresponding 2D tracked keypoints (process action 950). As indicated previously, the estimation procedure will be described in more detail later. On the other hand, if it is determined the tallied number of 2D-3D point correspondences does not exceed the prescribed 2D-3D point correspondences threshold number, then the 3D position and 3D orientation of the video camera for the current image frame is estimated by applying the last-estimated translational and angular velocities to the last-estimated 3D position and 3D orientation of the video camera for the immediate preceding frame (process action 952). Finally, the current translational and angular velocities are updated using on the current estimate of the camera pose (process action 954). Here again, in one embodiment, this is achieved using a conventional Kalman filter update procedure.

1.2.6 Guided Matching

Unlike global matching, where a voting scheme was used to narrow down the search to a few images, in guided matching, the scope is computed by inspecting the known 2D-3D correspondences. More particularly, in one embodiment the number of 3D points (from the known matches) visible in each image is counted, and then a prescribed number (e.g., 30) of the top scoring database images where some 3D points were visible are identified. In this way, the k-ANN search for the query descriptors is now constrained to retrieve descriptors that belong to one of the selected images.

Although the foregoing check could have been enforced after the nearest neighbor search step, significant speedup is obtained by avoiding unnecessary distance computations during the backtracking stage of the kd-tree search. Thus, by checking the descriptor's image label, the ones that are out-of-scope can be rejected early. The descriptors returned by the nearest neighbor query are taken and 3D point matches are then obtained from them in the same manner as described previously for global matching. The final matches are then obtained after geometric verification is performed on the one-to-many 2D-3D matches using the camera pose estimate computed from the known matches.

Figure 10A:
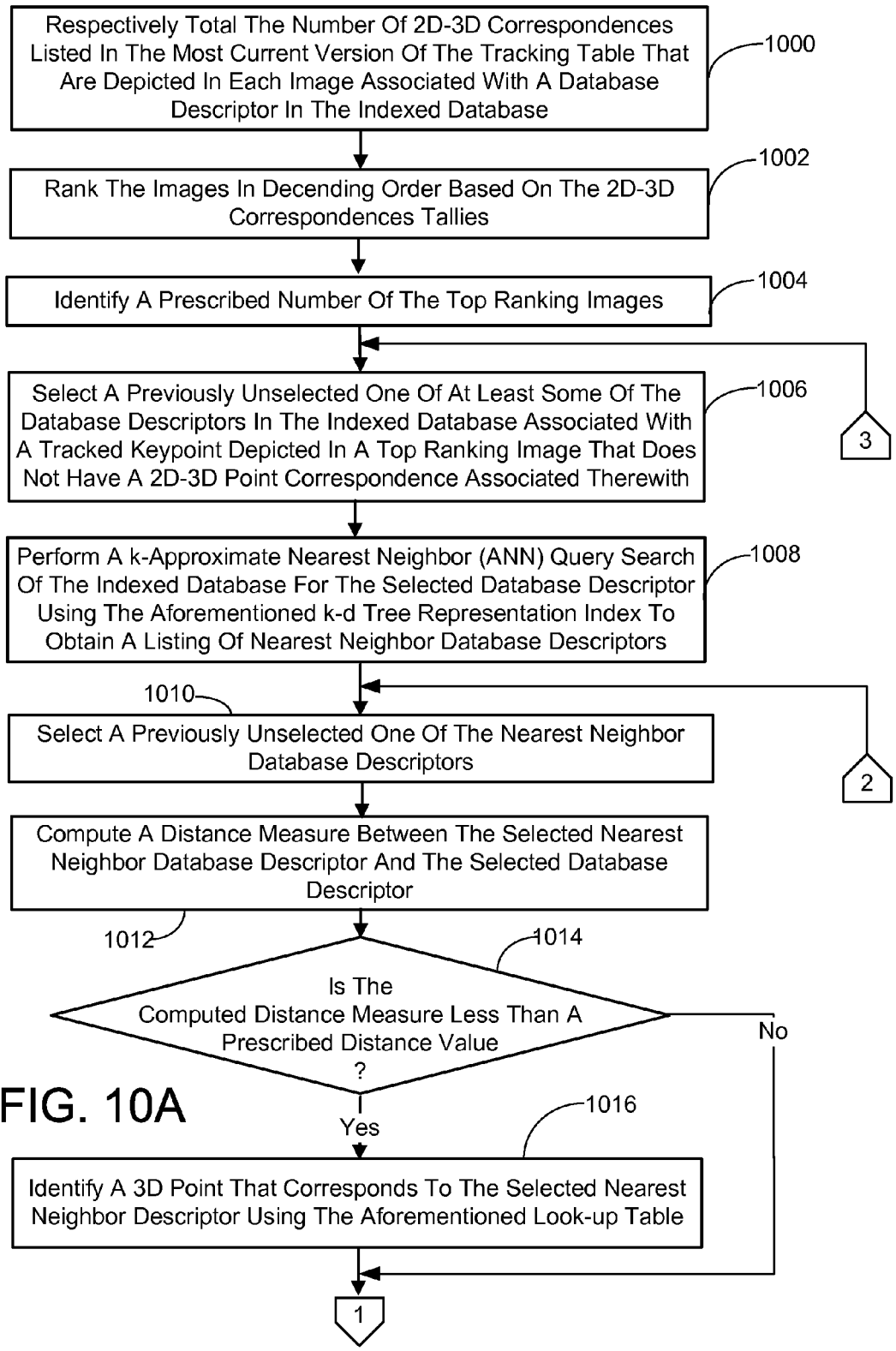
FIGS. 10A-C depict a flow diagram generally outlining one embodiment of a process for performing a guided matching procedure.
Figure 10B:
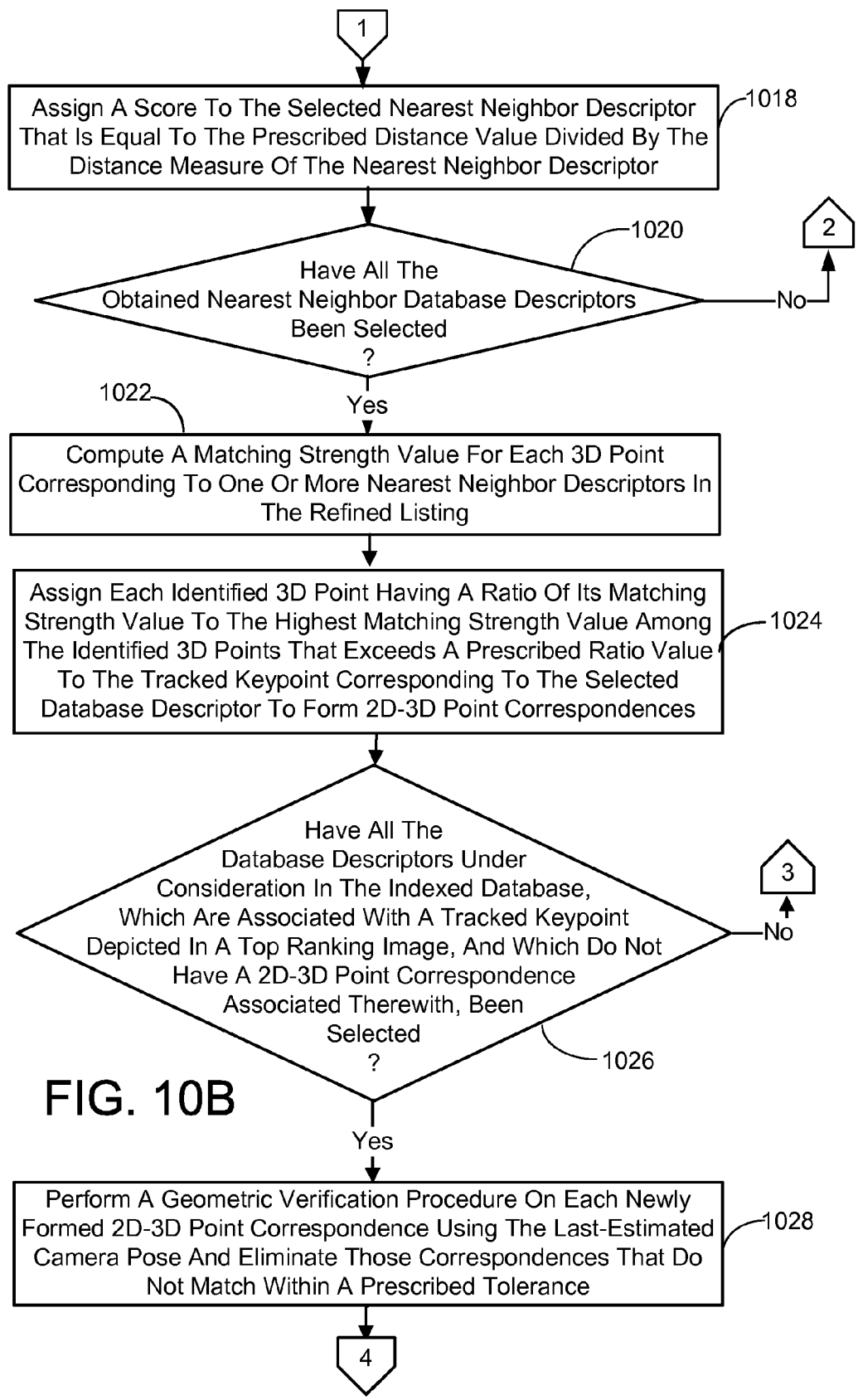
Figure 10C:
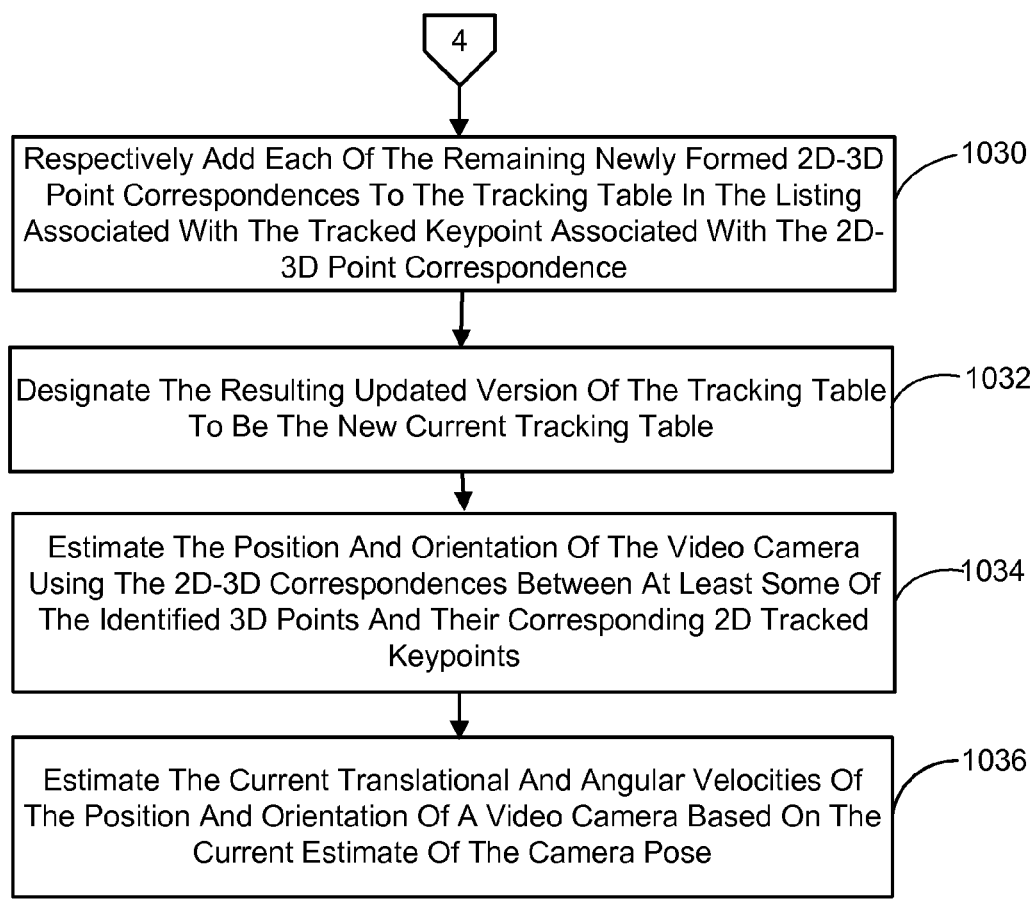

In view of the foregoing and in reference to FIGS. 10A-C, one general embodiment of performing the guided matching procedure is as follows. For each image associated with a database descriptor in the indexed database, the number of 2D-3D correspondences listed in the most current version of the tracking table that are depicted in the image are totaled (process action 1000). The images are then ranked in descending order based on the 2D-3D correspondences tallies (process action 1002), and a prescribed number (e.g., 30) of the top ranking images are identified (process action 1004). A previously unselected one of at least some of the database descriptors in the indexed database associated with a tracked keypoint depicted in a top ranking image that does not have a 2D-3D point correspondence associated therewith, is selected next (process action 1006). The significance of possibly selecting fewer than all of such database descriptors will be described shortly. A k-approximate nearest neighbor (ANN) query search of the indexed database is then performed for the selected database descriptor using the aforementioned k-d tree representation index (e.g., k=50) to obtain a listing of nearest neighbor database descriptors (process action 1008). A previously unselected one of the obtained nearest neighbor database descriptors is then selected (process action 1010). A distance measure between the selected nearest neighbor database descriptor and the selected database descriptor is computed, where this difference measure increases in value the more the selected nearest neighbor database descriptor differs from the selected database descriptor (process action 1012). It is then determined if the computed distance measure is less than a prescribed distance value (process action 1014). If so, a 3D point is identified that corresponds to the selected nearest neighbor descriptor using the aforementioned look-up table (process action 1016). If not, no action is taken. Next, a score is assigned to the selected nearest neighbor descriptor that is equal to the prescribed distance value divided by the distance measure of the nearest neighbor descriptor (process action 1018). It is then determined if all the obtained nearest neighbor database descriptors have been selected and processed (process action 1020). If not, process actions 1010 through 1020 are repeated as appropriate. However, if all the aforementioned nearest neighbor database descriptors have been selected and processed, then a matching strength value is computed for each 3D point corresponding to one or more nearest neighbor descriptors in the refined listing (process action 1022). In one embodiment, this matching strength value is computed as the summation of the scores of the nearest neighbor descriptors associated with the 3D point. Each identified 3D point having a ratio of its matching strength value to the highest matching strength value among the identified 3D points that exceeds a prescribed ratio value (e.g. 0.75) is then assigned to the tracked keypoint corresponding to the selected database descriptor to form 2D-3D point correspondences (process action 1024). It is then determined if all the database descriptors under consideration in the indexed database, which are associated with a tracked keypoint depicted in a top ranking image, and which do not have a 2D-3D point correspondence associated therewith, have been selected and processed (process action 1026). If not, process actions 1006 through 1026 are repeated as appropriate. When all the aforementioned database descriptors have been selected and processed, a geometric verification procedure is performed on each newly formed 2D-3D point correspondence using the last-estimated camera pose and those correspondences that do not match are eliminated from consideration (process action 1028). More particularly, in one embodiment, a 3D point is deemed valid (and so not eliminated) if it projects using the last-estimated camera pose to within a prescribed number of pixels (e.g., 5) of the 2D pixel location in the frame under consideration. Each of the remaining newly formed 2D-3D point correspondences are then respectively added to the tracking table in the listing associated with the tracked keypoint associated with that 2D-3D point correspondence (process action 1030), and the resulting updated version of the tracking table is designated to be the new current tracking table (process action 1032).

Assuming at least one newly-formed 2D-3D point correspondences has been added to the tracking table, the process continues with estimating the 3D position and 3D orientation of the video camera using the 2D-3D correspondences between at least some of the identified 3D points and their corresponding 2D tracked keypoints (process action 1034). As indicated previously, the estimating procedure will be described in more detail later. Finally, the current translational and angular velocities of the 3D position and 3D orientation of a video camera are estimated based on the current estimate of the camera pose (process action 1036).

1.2.7 Distributed Guided Matching

As indicated in the foregoing guided matching process, there is a possibility of selecting fewer than all of the database descriptors in the indexed database associated with a tracked keypoint depicted in a top ranking image that does not have a 2D-3D point correspondence associated therewith. While all such database descriptors could be selected and processed, there is an advantage to selecting no more than a prescribed maximum number for any one image frame. More particularly, when many new tracked keypoints are added to the tracking table as is possible in the foregoing processes, computing their DAISY descriptors and querying the kd-tree immediately will increase the latency in the associated image frames. However, all these matches are typically not needed right away. Therefore, it is possible to distribute this computation over several successive frames, performing guided matching only on a small batch of tracked keypoints at a time (e.g., no more than 100-150), until all pending keypoints have been processed. This lazy evaluation strategy also reduces the overall number of descriptors/queries computed. This is because the tracker usually drops many features right after new keypoints are inserted into the track table and by delaying the matching computation, wasting computation on keypoints that do not get tracked is avoided. A verified 2D-3D match is saved in the track table and reused as long as the keypoint is accurately tracked. When fewer than $\kappa_2$ (e.g., 10) 2D-3D matches are available to the tracker, it relocalizes by performing the above-described global matching process.

1.2.8 Camera Pose Estimation and Filtering

With regard to the aforementioned estimation of the 3D position and 3D orientation of the video camera, given 2D-3D matches, the 6-DOF pose can be robustly computed. First, random sample consensus (RANSAC) is used with three-point pose estimation to find a set of inliers, after which the pose parameters are refined using non-linear least squares optimization. If less than 10 inliers are found, the estimate is rejected.

With regard to the aforementioned estimation of the translational and angular velocities, the camera pose estimate is filtered with a discrete Kalman filter that takes 3D position and 3D orientation as input and estimates velocity. It assumes a constant velocity and angular velocity motion model is used. This can be implemented as two independent filters for 3D position and 3D orientation, which has particular use for the previously mentioned quadrotor MAV.

Figure 11:
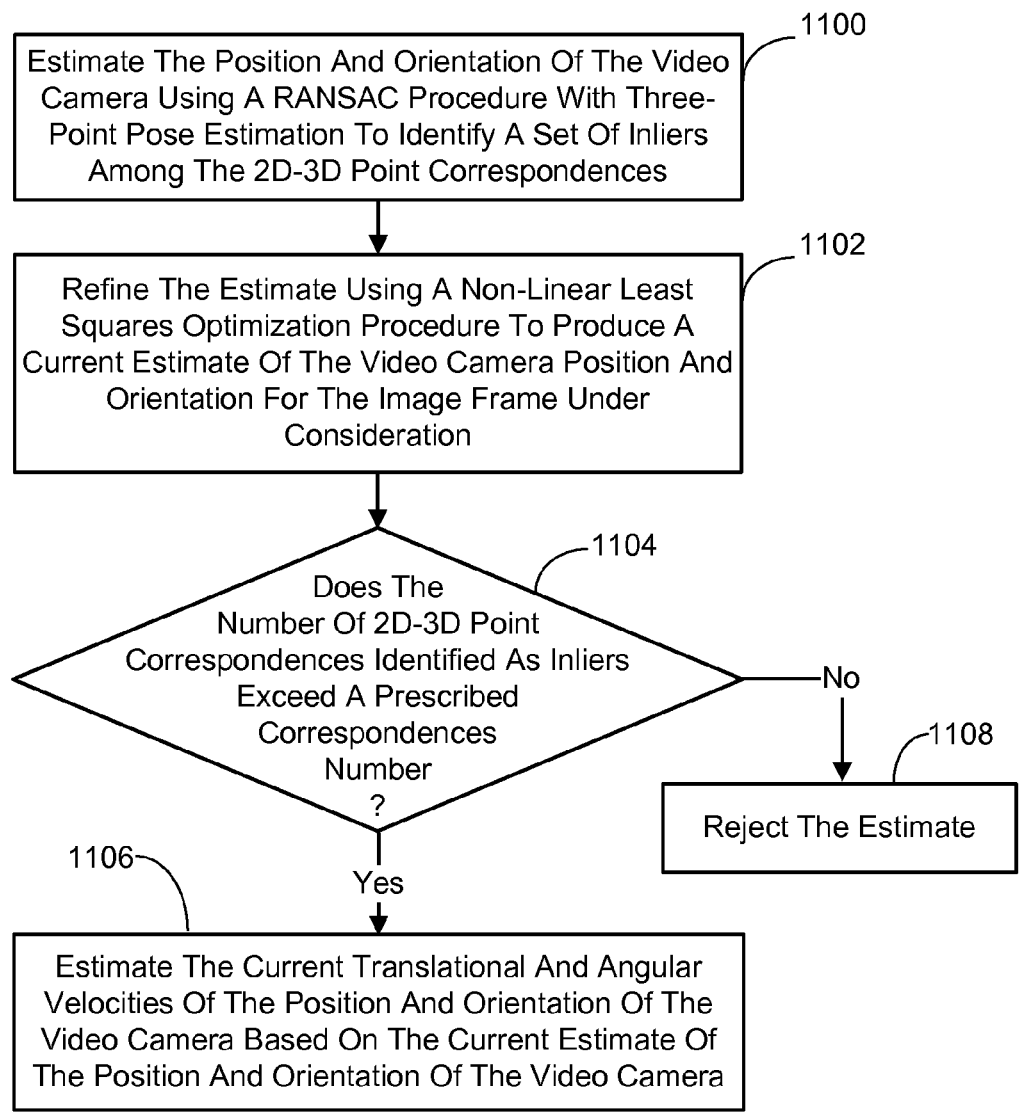
FIG. 11 is a flow diagram generally outlining one embodiment of a process for estimating a camera pose, and translational and angular velocities, for an image frame.

In view of the foregoing and in reference to FIG. 11, one general embodiment of estimating the camera pose, and translational and angular velocities, involves initially estimating the 3D position and 3D orientation of the video camera using a RANSAC procedure with three-point pose estimation to identify a set of inliers among the 2D-3D point correspondences (process action 1100). The initial estimate is then refined using a non-linear least squares optimization procedure to produce a current estimate of the video camera 3D position and 3D orientation for the image frame under consideration (process action 1102). Next, in process action 1104, it is determined whether the number of 2D-3D point correspondences identified as inliers exceeds a prescribed correspondences number (e.g., 10). If so, the current translational and angular velocities of the 3D position and 3D orientation of a video camera are estimated based on the current estimate of the 3D position and 3D orientation of the video camera (process action 1106). If not, the estimate is rejected (process action 1108).

1.2.9 Exemplary Pseudo Code for Image-Based Localization

Figures 12, 13:
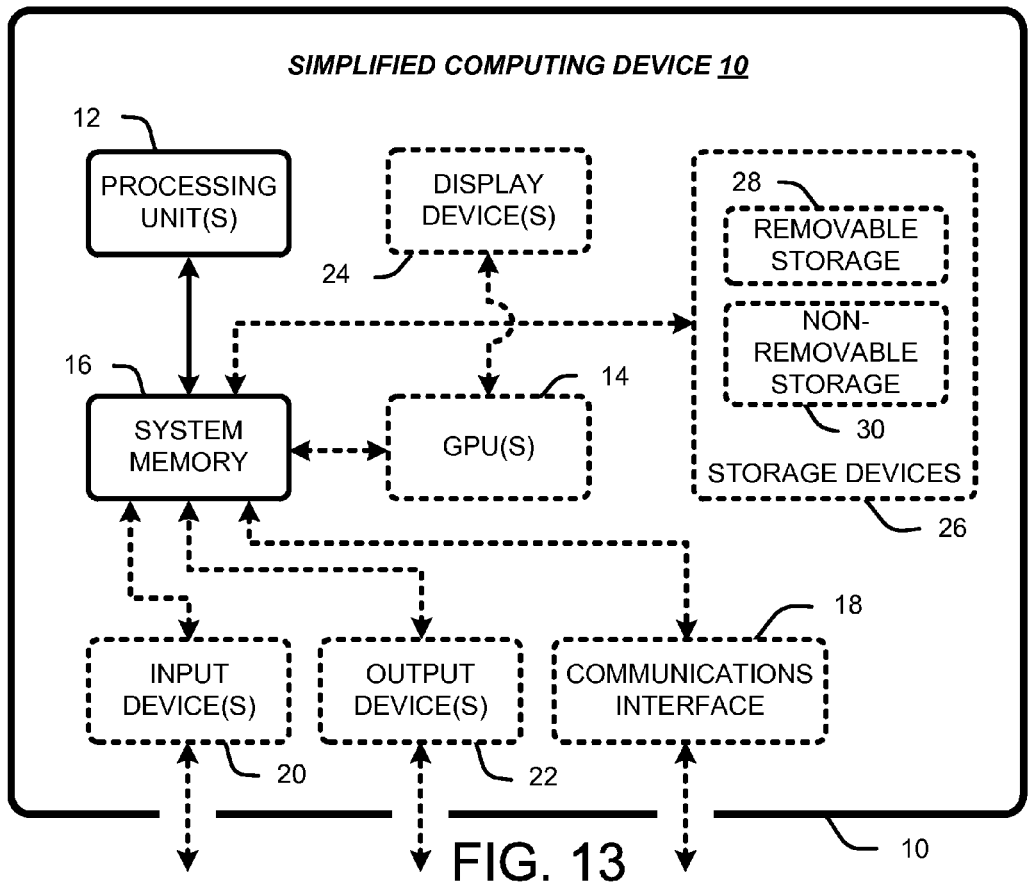
FIG. 12 depicts an exemplary pseudo code procedure for implementing one embodiment of the image-based localization technique.
FIG. 13 is a diagram depicting a general purpose computing device constituting an exemplary system for implementing image-based localization technique embodiments described herein.

FIG. 12 presents one embodiment of a pseudo code procedure for implementing the image-based localization process described above. More particularly, this procedure localizes frame f, given the 3DR map M, and a track table T. It is noted that in the procedure EXTRACT-KEYPOINT is described in the foregoing keypoint tracking section, as is TRACK-2D which performs the actual keypoint tracking. When the keypoint count drops below $\kappa_1$ (e.g., 25), new candidates are added via ADD-GOODFEATURES in regions where there are no tracked keypoints, as described in the foregoing tracking table generation section. The POSE ESTIMATE and KALMAN_FILTER PREDICT & UPDATE procedures were described in the Camera Pose Estimating and Filtering section. Further, the GUIDED MATCHING and MATCHES PENDING procedures are described in the foregoing Guided Matching and Distributed Guided Matching sections. And finally, the GLOBAL MATCHING procedure was described in the foregoing Global Matching section.

2.0 Exemplary Operating Environments

The image-based localization embodiments described herein are operational within numerous types of general purpose or special purpose computing system environments or configurations. FIG. 13 illustrates a simplified example of a general-purpose computer system on which various embodiments and elements of the image-based localization embodiments, as described herein, may be implemented. It should be noted that any boxes that are represented by broken or dashed lines in FIG. 13 represent alternate embodiments of the simplified computing device, and that any or all of these alternate embodiments, as described below, may be used in combination with other alternate embodiments that are described throughout this document.

For example, FIG. 13 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the image-based localization embodiments described herein, the device should have a sufficient computational capability and system memory to enable basic computational operations. In particular, as illustrated by FIG. 13, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 13 may also include other components, such as, for example, a communications interface 18. The simplified computing device of FIG. 13 may also include one or more conventional computer input devices 20 (e.g., pointing devices, keyboards, audio input devices, video input devices, haptic input devices, devices for receiving wired or wireless data transmissions, etc.). The simplified computing device of FIG. 13 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 13 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various image-based localization embodiments described herein, or portions thereof, may be stored, received, transmitted, or read from any desired combination of computer or machine readable media or storage devices and communication media in the form of computer executable instructions or other data structures.

Finally, the image-based localization embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

During online localization, in the image-based localization embodiments described previously, it was assumed that the feature database and 3DR map will fit into the main memory of the computing device employed to implement the technique. However, an out-of-core approach should be possible for larger scenes, where the 3DR map is partitioned into overlapping submaps, kd-trees are built for each of them and only a few relevant sub-maps need to be in the main memory at any one time. This alternate scheme can also employ a separate lookup table and separate tracking table for each sub-map. As such the foregoing processes would be performed on a sub-map by sub-map basis.

It is also noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for computing the 3D position and 3D orientation of a video camera used to capture sequential image frames of an environment for which a three dimensional (3D) reconstruction has been pre-computed to identify 3D points in the environment that correspond to two dimensional (2D) points in previously-captured images of the environment, comprising:
    using a computer to perform the following process actions:
        constructing an indexed database comprising multiple representative database descriptors for each 3D point in the 3D reconstruction, ones of said database descriptors for each 3D point being computed at different scales and from multiple ones of said previously-captured images of the environment;
        after the indexed database is constructed, inputting image frames from the video camera as they are captured;
        for each consecutive image frame input,
            identifying tracked keypoints representing 2D image frame locations in the image frame, said tracked keypoints being either newly added or previously depicted and identified in one or more previously-input image frames,
            computing a database descriptor for each newly added tracked keypoint identified in the image frame, said database descriptor being of the same type as computed for the indexed database,
            identifying 3D points in the 3D reconstruction of the environment that correspond to the tracked keypoints, said identifying of 3D points comprising, for each tracked keypoint, matching the database descriptor computed for the tracked keypoint to one or more descriptors in the indexed database and determining the 3D point associated with the matched database descriptors in the indexed database, and
            estimating the 3D position and 3D orientation of the video camera.

2. The process of claim 1, wherein the process action of constructing the indexed database, comprises the actions of:
    for each of said previously-captured images of the environment,
        generating an image pyramid comprising a plurality of levels each of which depicts the scene captured by the image at a different scale;
        for each level of the image pyramid of the image,
            identifying keypoints,
            computing a database descriptor for each identified keypoint,
        generating a database comprising each database descriptor as an entry and assigning to each database descriptor a set of indices indicating which previously-captured image of the environment the keypoint associated with the descriptor came from and the image coordinates of that keypoint; and constructing a k-d tree representation index for the database descriptors in the database.

3. The process of claim 2, wherein the process action of constructing the indexed database, further comprises an action of constructing a look-up table that maps each database descriptor in the database to a 3D point in the 3D reconstruction.

4. The process of claim 3, wherein the process action of constructing the look-up table, comprises the actions of:
   for each level of the image pyramid of each previously-captured image of the environment,
      projecting each 3D point from the 3D reconstruction, which is depicted in the image under consideration, into the pyramid level of the image, and
      for each keypoint previously identified in the pyramid level of the image,
         identifying the projected 3D point that is closest to the keypoint,
         determining if the identified closest projected 3D point is within a threshold distance of the keypoint, and
         whenever it is determined that the identified closest projected 3D point is within the threshold distance, assigning the keypoint and its associated database descriptor to the 3D point corresponding to the closest projected 3D point; and
   creating an entry in said look-up table listing each database descriptor in the indexed database along with the 3D point in the 3D reconstruction assigned thereto and the keypoint associated with the database descriptor.

5. The process of claim 4, wherein the process action of constructing the look-up table, further comprises the actions of:
   grouping the previously-captured images of the environment used to produce the 3D reconstruction into overlapping clusters based on the 3D position and 3D orientation of the camera used to capture each of the previously-captured images;
   assigning a unique group identifier to each cluster of images;
   for each cluster of images,
      identifying the database descriptors associated with each image in the cluster using said indexed database, and
      adding the group identifier assigned to the cluster to the entry in said look-up table pertaining to each of the identified database descriptors.

6. The process of claim 5, wherein the process action of identifying keypoints in the currently input image frame which were depicted and identified in one or more previously-input image frames, comprises the actions of:
   using a Harris corner detection procedure to identify candidate keypoints in the current image frame;
   for each candidate keypoint, determining whether a Harris corner cornerness value computed for the candidate keypoint exceeds an adaptive cornerness threshold, said adaptive cornerness threshold being computed as a prescribed percentage of the maximum cornerness value in the last, previously-input image frame;
   whenever a candidate keypoint is found to have a Harris corner cornerness value that exceeds the adaptive cornerness threshold or for all the candidate keypoints if the current image frame is the first-input image frame, designating the candidate keypoint as a keypoint in the current image frame, computing a Binary Robust Independent Elementary Feature (BRIEF) descriptor for a prescribed sized and shaped pixel patch centered around the keypoint and assigning the BRIEF descriptor to the keypoint;
   for each keypoint designated as a tracked keypoint in the last, previously-input image frame,
      establishing a prescribed sized and shaped search window that is centered on a location in the current image frame that corresponds to the coordinates of the tracked keypoint under consideration in the last, previously-input image frame,
      computing a difference measure between each BRIEF descriptors associated with the keypoints in the current image frame that lie within said established search window and a BRIEF descriptor computed for the tracked keypoint under consideration in the last, previously-input image frame,
      determining which BRIEF descriptor associated with the keypoints in the current image frame that lie within said established search window is the most similar to the BRIEF descriptor computed for the tracked keypoint under consideration in the last, previously-input image frame based on the computed difference measures,
      designating the keypoint in the current input image frame whose BRIEF descriptor was found to be most similar to the BRIEF descriptor computed for the tracked keypoint under consideration in the last, previously-input image frame to be a tracked keypoint which corresponds to the tracked keypoint that was depicted and identified in one or more previously-input image frames, and which is associated with the same database descriptor as was computed for the tracked keypoint that was depicted and identified in one or more previously-input image frames.

7. The process of claim 6, wherein the process action of computing difference measures, comprises an action of computing a Hamming distance between each BRIEF descriptors associated with the keypoints in the current image frame that lie within said established search window and a BRIEF descriptor computed for the tracked keypoint under consideration from the last, previously-input image frame.

8. The process of claim 6, further comprising performing, prior to performing the process action of computing a database descriptor for each newly added tracked keypoint identified in the image frame, the actions of:
   generating a current version of a tracking table, said tracking table comprising a listing of tracked keypoints along with, for each keypoint listed, a BRIEF descriptor computed for the keypoint, and if known, a 2D-3D point correspondence which identifies the coordinates of a 3D point in the 3D reconstruction that corresponds the 2D tracked keypoint;
   determining if the current version of the tracking table indicates that the number of tracked keypoints listed exceeds a prescribed minimum tracked keypoint count;
   whenever the tracked keypoint count does not exceed the prescribed minimum tracked keypoint count,
      identifying areas in the current image frame not having tracked keypoints therein,
      for each identified area, adding keypoints identified in the current image frame that lie in the identified area, but which are not designated as tracked keypoints, to the current version of the track table, along with the previously-computed BRIEF descriptors assigned thereto, and designating the added keypoints to be tracked keypoints, to produce a new current version of the tracking table.

9. The process of claim 8, further comprising:
performing, prior to performing the process action of estimating the 3D position and 3D orientation of the video camera, the actions of,
- tallying the number of 2D-3D point correspondences listed in the current version of the tracking table,
- determining if the tallied number exceeds a prescribed 2D-3D point correspondences threshold number;

whenever it is determined that the tallied number does not exceed the prescribed 2D-3D point correspondences threshold number,
- for each database descriptor computed for a tracked keypoint identified in the current image frame,
  - performing a k-approximate nearest neighbor (ANN) query search of the indexed database using the k-d tree representation index to obtain a listing of nearest neighbor descriptors,
  - identifying a distance measure between each nearest neighbor descriptor in the listing and the database descriptor under consideration, said distance measure increasing in value the more a nearest neighbor descriptor differs from the database descriptor under consideration,
  - for each nearest neighbor descriptor in the listing, determining if its distance measure is less than a prescribed distance,
    - whenever the distance measure of a nearest neighbor descriptor in the listing is less than the prescribed distance, identifying the 3D point using said look-up table that corresponds to the nearest neighbor descriptor from the listing,
    - identifying each cluster of images that the identified 3D point belongs to based on the group identifier associated with the identified 3D in the look-up table,
    - assigning a score to each identified cluster that is equal to the prescribed distance divided by the distance measure of the nearest neighbor descriptor under consideration,
  - ascertaining the highest score assigned to the identified clusters,
  - computing a minimum score, said minimum score being defined as a prescribed percentage of the ascertained highest score,
  - identifying those clusters having a score that is equal to or exceeds the minimum score and identifying the database images belonging to the identified clusters,
  - eliminating from the listing those nearest neighbor descriptors that are not associated with the identified database images to produce a refined listing,
  - for each 3D point corresponding to one or more nearest neighbor descriptors in the refined listing, computing a matching strength value, said matching strength value being defined as the summation of the scores of the nearest neighbor descriptors associated with the 3D point, and
  - for the keypoint corresponding to the descriptor under consideration,
    - identifying the 3D point having the greatest matching strength value and the 3D point having the second greatest matching strength value,
    - determining if the second greatest matching strength value divided by the greatest matching strength value for the 3D points exceeds a prescribed ratio value,
    - whenever it is determined that the second greatest matching strength value divided by the greatest matching strength value exceeds the prescribed ratio value, assigning the 3D point having the greatest matching strength value to the keypoint to form a 2D-3D point correspondence,
  - computing an estimate of the current 3D position and 3D orientation of a video camera by applying the last-estimated translational and angular velocities to the last-estimated 3D position and 3D orientation of the video camera for the immediate preceding frame,
  - performing a geometric verification procedure on each newly formed 2D-3D point correspondence using the last-estimated camera pose and eliminating those newly formed 2D-3D point correspondences that do not match within a prescribed tolerance,
  - respectively adding each of the remaining newly formed 2D-3D point correspondences to the tracking table in the listing associated with the tracked keypoint associated with the 2D-3D point correspondence, and
  - designating the updated version of the tracking table to be the new current tracking table.

10. The process of claim 9, further comprising the process actions of:
whenever one or more newly-formed 2D-3D point correspondences are added to the tracking table,
- tallying the number of 2D-3D point correspondences listed in the current version of the tracking table,
- determining if the tallied number of 2D-3D point correspondences exceeds said prescribed 2D-3D point correspondences threshold number,
  - whenever it is determined the tallied number of 2D-3D point correspondences exceeds said prescribed 2D-3D point correspondences threshold number, performing said process action of estimating the 3D position and 3D orientation of the video camera using the 2D-3D correspondences between at least some of the identified 3D points and the corresponding 2D location of the tracked keypoints in the current frame, and
  - whenever it is determined the tallied number of 2D-3D point correspondences does not exceed said prescribed 2D-3D point correspondences threshold number, performing said process action of estimating the 3D position and 3D orientation of the video camera by designating the 3D position and 3D orientation of the video camera computed by applying the last-estimated translational and angular velocities to the last-estimated 3D position and 3D orientation of the video camera for the immediate preceding frame to be the estimate for the current image frame, and
- updating the current translational and angular velocities of the video camera using a Kalman filter updating procedure.

11. The process of claim 8, further comprising the actions of:
whenever it is determined that the tallied number does exceed the prescribed 2D-3D point correspondences threshold number, performing said process action of estimating the 3D position and 3D orientation of the video camera using the 2D-3D correspondences between at least some of the identified 3D points and their corresponding 2D tracked keypoints;
determining if there are tracked keypoints listed in the most current version of the tracking table that do not have a 2D-3D point correspondence associated therewith;

whenever it is determined that there are no tracked keypoints listed in the most current version of the tracking table that do not have a 2D-3D point correspondence associated therewith, updating the current translational and angular velocities of the moving video camera using a Kalman filter updating procedure; and whenever it is determined that there are tracked keypoints listed in the most current version of the tracking table that do not have a 2D-3D point correspondence associated therewith, for each image associated with a database descriptor in the indexed database, tallying the number of 2D-3D correspondences listed in the most current version of the tracking table that are depicted in the image, ranking the images in decending order based on the 2D-3D correspondences tallies, identifying a prescribed number of the top ranking images, for at least some of the database descriptors in the indexed database associated with a tracked keypoint depicted in the top ranking images that does not have a 2D-3D point correspondence associated therewith, performing a k-approximate nearest neighbor (ANN) query search of the indexed database using the k-d tree representation index to obtain a listing of nearest neighbor descriptors, identifying a distance measure between each nearest neighbor descriptor in the listing and the database descriptor under consideration, said distance measure increasing in value the more a nearest neighbor descriptor differs from the database descriptor under consideration, for each nearest neighbor descriptor in the listing, determining if its distance measure is less than a prescribed distance, whenever the distance measure of a nearest neighbor descriptor in the listing is less than the prescribed distance, identifying the 3D point using said look-up table that corresponds to the nearest neighbor descriptor from the listing, assigning a score to the nearest neighbor descriptor that is equal to the prescribed distance divided by the distance measure of the nearest neighbor descriptor, for each identified 3D point corresponding to one or more nearest neighbor descriptors in the listing, computing a matching strength value, said matching strength value being defined as the summation of the scores of the nearest neighbor descriptors associated with the 3D point, assigning each identified 3D point having a ratio of its matching strength value to the highest matching strength value among the identified 3D points that exceeds the prescribed ratio value to the tracked keypoint corresponding to the database descriptor under consideration to form 2D-3D point correspondences, performing a geometric verification procedure on each newly formed 2D-3D point correspondence using the last-estimated camera pose and eliminating those newly formed 2D-3D point correspondences that do not match within a prescribed tolerance, respectively adding each of the remaining newly formed 2D-3D point correspondences to the tracking table in the listing associated with the tracked keypoint associated with the 2D-3D point correspondence, and designating the updated version of the tracking table to be the new current tracking table.

12. The process of claim 11, further comprising the process actions of:

whenever one or more newly-formed 2D-3D point correspondences are added to the tracking table, performing said process action of estimating the 3D position and 3D orientation of the video camera using the 2D-3D correspondences between at least some of the identified 3D points and their corresponding 2D tracked keypoints, and updating the current translational and angular velocities of the video camera using a Kalman filter updating procedure.

13. The process of claim 11, wherein said at least some of the database descriptors in the indexed database associated with a tracked keypoint depicted in the top ranking images that does not have a 2D-3D point correspondence associated therewith, is defined as all the database descriptors in the indexed database associated with a tracked keypoint depicted in the top ranking images that does not have a 2D-3D point correspondence associated therewith up to a prescribed maximum number.

14. The process of claim 5, wherein the process action of identifying keypoints in the currently input image frame which were depicted and identified in one or more previously-input image frames, comprises the actions of:

using a Harris corner detection procedure to identify candidate keypoints in the current image frame;

for each candidate keypoint, determining whether a Harris corner cornerness value computed for the candidate keypoint exceeds an adaptive cornerness threshold, said adaptive cornerness threshold being computed as a prescribed percentage of the maximum cornerness value in the last, previously-input image frame;

whenever a candidate keypoint is found to have a Harris corner cornerness value that exceeds the adaptive cornerness threshold or for all the candidate keypoints if the current image frame is the first-input image frame, designating the candidate keypoint as a keypoint in the current image frame, computing a Binary Robust Independent Elementary Feature (BRIEF) descriptor for a prescribed sized and shaped pixel patch centered around the keypoint and assigning the BRIEF descriptor to the keypoint;

for each keypoint designated as a tracked keypoint in the last, previously-input image frame, establishing a prescribed sized and shaped search window that is centered on a location in the current image frame that corresponds to the coordinates of the tracked keypoint under consideration in the last, previously-input image frame, computing a difference measure between each BRIEF descriptors associated with the keypoints in the current image frame that lie within said established search window and a BRIEF descriptor computed for the tracked keypoint under consideration in the last, previously-input image frame, determining which BRIEF descriptors associated with the keypoints in the current image frame that lie within said established search window are the most similar and the second most similar to the BRIEF descriptor computed for the tracked keypoint under consideration in the last, previously-input image frame based on the computed difference measures, computing a ratio of the difference measure computed for the current image frame keypoint BRIEF descriptor determined to be most similar to the BRIEF descriptor computed for the tracked keypoint under consideration in the last, previously-input image frame to the difference measure computed for the current image frame keypoint BRIEF descriptor representing the second most similar to the BRIEF descriptor computed for the tracked keypoint under consideration in the last, previously-input image frame; and whenever the computed ratio is less than a prescribed number, designating the current image frame keypoint whose BRIEF descriptor was determined to be most similar to the BRIEF descriptor computed for the tracked keypoint under consideration in the last, previously-input image frame as a tracked keypoint which corresponds to the tracked keypoint that was depicted and identified in one or more previously-input image frames, and which is associated with the same database descriptor as was computed for the tracked keypoint that was depicted and identified in one or more previously-input image frames.

15. The process of claim 2, wherein the process action of identifying keypoints, comprises an action of employing a Harris corner detection procedure.

16. The process of claim 2, wherein the process action of computing a database descriptor for each identified keypoint, comprises the actions of:

for each of the identified keypoints,
identifying the orientation of the keypoint associated with a peak in a gradient orientation histogram, said orientation being defined in terms of an angle of rotation of a prescribed patch axis about the keypoint from a prescribed image axis,
sampling a patch of pixels from the level of the image pyramid of the image under consideration, said patch having a prescribed shape and size which is centered on the keypoint and which is rotated such that said patch axis forms the identified orientation angle with said image axis,
computing a DAISY descriptor for the sampled patch of pixels, and
establishing a database descriptor for the keypoint comprising said orientation angle and said DAISY descriptor.

17. A computer-implemented process for computing the 3D position and 3D orientation of a video camera used to capture sequential image frames of an environment for which a three dimensional (3D) reconstruction has been pre-computed to identify 3D points in the environment that correspond to two dimensional (2D) points in previously-captured images of the environment, comprising:

using a computer to perform the following process actions:
constructing an indexed database comprising multiple representative database descriptors for each 3D point in the 3D reconstruction, ones of said database descriptors for each 3D point being computed at different scales and from multiple ones of said previously-captured images of the environment;
after the indexed database is constructed, inputting image frames from the video camera as they are captured;
for each consecutive image frame input,
identifying tracked keypoints representing 2D image frame locations in the image frame, said tracked keypoints being either newly added or previously depicted and identified in one or more previously-input image frames,
computing a database descriptor for each newly added tracked keypoint identified in the image frame, said database descriptor being of the same type as computed for the indexed database,
identifying 3D points in the 3D reconstruction of the environment that correspond to the tracked keypoints to produce 2D-3D point correspondences each of which identifies the coordinates of a 3D point in the 3D reconstruction that corresponds the 2D tracked keypoint, said identifying of 3D points comprising, for each tracked keypoint, matching the database descriptor computed for the tracked keypoint to one or more descriptors in the indexed database and determining the 3D point associated with the matched database descriptors in the indexed database,
initially estimating the 3D position and 3D orientation of the video camera using a random sample consensus (RANSAC) procedure with three-point pose estimation to identify a set of inliers among the 2D-3D point correspondences,
refining the initial estimate of the 3D position and 3D orientation of the video camera using a non-linear least squares optimization procedure to produce a current estimate of the video camera 3D position and 3D orientation for the image frame under consideration,
determining whether the number of 2D-3D point correspondences identified as inliers exceeds a prescribed correspondences number,
whenever it is determined that the number of 2D-3D point correspondences identified as inliers exceeds the prescribed correspondences number, updating the current translational and angular velocities of the video camera using a Kalman filter updating procedure.

18. A computer-implemented process for computing the 3D position and 3D orientation of a video camera used to capture sequential image frames of an environment for which a three dimensional (3D) reconstruction has been pre-computed to identify 3D points in the environment that correspond to two dimensional (2D) points in previously-captured images of the environment, comprising:

using a computer to perform the following process actions:
constructing an indexed database comprising multiple representative database descriptors for each 3D point in the 3D reconstruction, ones of said database descriptors for each 3D point being computed at different scales and from multiple ones of said previously-captured images of the environment;
after the indexed database is constructed, inputting image frames from the video camera as they are captured;
for each consecutive image frame input,
identifying tracked keypoints representing 2D image frame locations in the image frame, said tracked keypoints being either newly added or previously depicted and identified in one or more previously-input image frames,
computing a database descriptor for each newly added tracked keypoint identified in the image frame, said database descriptor being of the same type as computed for the indexed database,
identifying 3D points in the 3D reconstruction of the environment that correspond to the tracked keypoints to produce 2D-3D point correspondences each of which identifies the coordinates of a 3D point in the 3D reconstruction that corresponds the 2D tracked keypoint, said identifying of 3D points comprising, for each tracked keypoint, matching the database descriptor computed for the tracked keypoint to one or more descriptors in the indexed database and determining the 3D point associated with the matched database descriptors in the indexed database, grouping the previously-captured images of the environment used to produce the 3D reconstruction into overlapping clusters based on the 3D position and 3D orientation of the camera used to capture each of the previously-captured images, assigning a unique group identifier to each cluster of images;

for each cluster of images,
identifying the database descriptors associated with each image in the cluster using said indexed database,
tallying the number of 2D-3D point correspondences,
determining if the tallied number exceeds a prescribed 2D-3D point correspondences threshold number;
whenever it is determined that the tallied number does not exceed the prescribed 2D-3D point correspondences threshold number,
for each database descriptor computed for a tracked keypoint identified in the current image frame,
performing a search of the indexed database to obtain a listing of nearest neighbor descriptors,
identifying a distance measure between each nearest neighbor descriptor in the listing and the database descriptor under consideration, said difference measure increasing in value the more a nearest neighbor descriptor differs from the database descriptor under consideration,
for each nearest neighbor descriptor,
determining if its distance measure is less than a prescribed distance,
whenever the distance measure of a nearest neighbor descriptor in the listing is less than the prescribed distance, identifying the 3D point that corresponds to the nearest neighbor descriptor,
identifying each cluster of images that the identified 3D point belongs to,
assigning a score to each identified cluster that is equal to the prescribed distance divided by the distance measure of the nearest neighbor descriptor under consideration,
ascertaining the highest score assigned to the identified clusters,
computing a minimum score, said minimum score being defined as a prescribed percentage of the ascertained highest score,
identifying those clusters having a score that is equal to or exceeds the minimum score and identifying the database images belonging to the identified clusters,
eliminating those nearest neighbor descriptors that are not associated with the identified database images,
for each 3D point corresponding to one or more remaining nearest neighbor descriptors, computing a matching strength value, said matching strength value being defined as the summation of the scores of the nearest neighbor descriptors associated with the 3D point, and
for the keypoint corresponding to the descriptor under consideration,
identifying the 3D point having the greatest matching strength value and the 3D point having the second greatest matching strength value,
determining if the second greatest matching strength value divided by the greatest matching strength value for the 3D points exceeds a prescribed ratio value,
whenever it is determined that the second greatest matching strength value divided by the greatest matching strength value exceeds the prescribed ratio value, assigning the 3D point having the greatest matching strength value to the keypoint to form a 2D-3D point correspondence,
computing an estimate of the current 3D position and 3D orientation of a video camera by applying the last-estimated translational and angular velocities to the last-estimated 3D position and 3D orientation of the video camera for the immediate preceding frame,
performing a geometric verification procedure on each newly formed 2D-3D point correspondence using the last-estimated camera pose and eliminating those newly formed 2D-3D point correspondences that do not match within a prescribed tolerance,
re-tallying the number of 2D-3D point correspondences,
determining if the re-tallied number of 2D-3D point correspondences exceeds said prescribed 2D-3D point correspondences threshold number,
whenever it is determined the re-tallied number of 2D-3D point correspondences exceeds said prescribed 2D-3D point correspondences threshold number, estimating the 3D position and 3D orientation of the video camera using the 2D-3D correspondences between at least some of the identified 3D points and their corresponding 2D tracked keypoints, and
estimating the current translational and angular velocities of the 3D position and 3D orientation of a video camera based on the current estimate of the 3D position and 3D orientation of the video camera.

19. The process of claim 18 further comprising the process actions of:
whenever it is determined the re-tallied number of 2D-3D point correspondences does not exceed said prescribed 2D-3D point correspondences threshold number, designating the 3D position and 3D orientation of the video camera computed by applying the last-estimated translational and angular velocities to the last-estimated 3D position and 3D orientation of the video camera for the immediate preceding frame to be the estimate for the current image frame; and
estimating the current translational and angular velocities of the 3D position and 3D orientation of a video camera based on the current estimate of the 3D position and 3D orientation of the video camera.

20. The process of claim 18, wherein the process action of constructing the indexed database further comprising the actions of:
for each of said previously-captured images of the environment,
generating an image pyramid comprising a plurality of levels each of which depicts the scene captured by the image at a different scale;
for each level of the image pyramid of the image,
identifying keypoints,
computing a database descriptor for each identified keypoint,
generating a database comprising each database descriptor as an entry and assigning to each database descriptor a set of indices indicating which previously-captured image of the environment the keypoint associated with the descriptor came from and the image coordinates of that keypoint; and constructing a k-d tree representation index for the database descriptors in the database; and wherein the process action of performing the search of the indexed database to obtain the listing of nearest neighbor descriptors, comprises an action of performing a k-approximate nearest neighbor (ANN) query search of the indexed database using the k-d tree representation index to obtain a listing of nearest neighbor descriptors.

\* \* \* \* \*